U S009335860B2

United States Patent
Nagahara et al.

(10) Patent No.: US 9,335,860 B2
(45) Date of Patent: May 10, 2016

(54) INFORMATION PROCESSING APPARATUS AND INFORMATION PROCESSING SYSTEM

(71) Applicants: Takanori Nagahara, Tokyo (JP); Kiyoshi Kasatani, Kanagawa (JP)

(72) Inventors: Takanori Nagahara, Tokyo (JP); Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/487,226

(22) Filed: Sep. 16, 2014

(65) Prior Publication Data

US 2015/0077369 A1 Mar. 19, 2015

(30) Foreign Application Priority Data

Sep. 17, 2013 (JP) ................................ 2013-192282
Sep. 4, 2014 (JP) ................................ 2014-180410

(51) Int. Cl.
| | |
|---|---|
| G06F 3/041 | (2006.01) |
| G06F 3/0354 | (2013.01) |
| G06F 3/038 | (2013.01) |
| G06F 3/14 | (2006.01) |
| G09G 5/00 | (2006.01) |
| G09G 5/12 | (2006.01) |
| G06F 3/0488 | (2013.01) |
| G06F 3/042 | (2006.01) |
| H04N 1/42 | (2006.01) |

(52) U.S. Cl.
CPC .............. *G06F 3/0416* (2013.01); *G06F 3/038* (2013.01); *G06F 3/03545* (2013.01); *G06F 3/0428* (2013.01); *G06F 3/0488* (2013.01); *G06F 3/1423* (2013.01); *G09G 5/003* (2013.01); *G09G 5/12* (2013.01); *H04N 1/42* (2013.01); *G09G 2320/10* (2013.01); *G09G 2340/045* (2013.01); *G09G 2340/0464* (2013.01); *G09G 2354/00* (2013.01)

(58) Field of Classification Search
CPC ... G06F 3/0416; G06F 3/0488; G06F 3/0428; G06F 3/042; G06F 2203/04106; H04N 1/42
See application file for complete search history.

(56) References Cited

U.S. PATENT DOCUMENTS

| | | | |
|---|---|---|---|
| 6,421,042 B1 * | 7/2002 | Omura | G06F 3/011 345/156 |
| 2003/0016253 A1 * | 1/2003 | Aoki | G06F 1/1626 715/863 |
| 2007/0192731 A1 * | 8/2007 | Townsend | G06F 3/0488 715/788 |
| 2007/0204047 A1 * | 8/2007 | Parker | G06F 3/0481 709/227 |
| 2011/0169756 A1 * | 7/2011 | Ogawa | G06F 3/03545 345/173 |

(Continued)

FOREIGN PATENT DOCUMENTS

| | | |
|---|---|---|
| JP | 5081088 | 11/2012 |
| JP | 2013-065125 | 4/2013 |
| JP | 2013-131204 | 7/2013 |

OTHER PUBLICATIONS

Japanese Office Action dated Jul. 28, 2015.

*Primary Examiner* — Liliana Cerullo
(74) *Attorney, Agent, or Firm* — IPUSA, PLLC

(57) ABSTRACT

An information processing apparatus including a display unit that displays an image is provided. The information processing apparatus includes a determination unit configured to determine that an electronic pen or a pointer has come into contact with the display unit, and a display control unit configured to control the display unit to display a display corresponding to the pointer when the determination unit determines that the contact with the display unit has been made by the pointer.

10 Claims, 24 Drawing Sheets

(56) References Cited

U.S. PATENT DOCUMENTS

2012/0293555 A1* 11/2012 Okano .................. G06F 3/0428 345/660

2013/0135346 A1 5/2013 Sakuramata et al.
2014/0013284 A1* 1/2014 Thomas .............. G06F 3/04812 715/856

* cited by examiner

FIG.6

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG.8

| X COORDINATE | Y COORDINATE | DIFFERENCE TIME | WRITING PRESSURE | c001 |
|---|---|---|---|---|
| 10 | 10 | 100 | 255 | |
| 12 | 10 | 200 | 255 | |
| 14 | 12 | 300 | 255 | |
| ... | ... | ... | ... | | c002 c003

| MEDIA DATA ID | DATA TYPE | RECORDING TIME | X COORDINATE | Y COORDINATE | WIDTH | HEIGHT | IMAGE DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG.10

| PRODUCT ID | LICENSE ID | EXPIRY |
|---|---|---|
| 1001 | 12345678abcdefgh | 2012/12/31 |
| 1001 | 4321dcba8765hgfe | – |
| ⋮ | ⋮ | ⋮ |

FIG.11

| NAME | EMAIL ADDRESS |
|---|---|
| TARO | taro@alpha.co.jp |
| HANAKO | hanako@beta.co.jp |
| – | jiro@gamma.co.jp |
| ⋮ | ⋮ |

FIG.12

| |
|---|
| iwb-20130610104423.pdf |
| iwb-20130625152245.pdf |
| iwb-20130628113418.pdf |
| ⋮ |

FIG.13A

| NAME | IP ADDRESS | CONNECTION STATUS |
|---|---|---|
| CONFERENCE ROOM 1 | 192.0.0.1 | IN SESSION |
| CONFERENCE ROOM 2 | 192.0.0.2 | OFFLINE |
| — | 192.0.0.3 | ONLINE |
| ... | ... | ... |

FIG.13B

| CONNECTION STATUS | COMMUNICATION | SESSION STATUS | PARTICIPATION |
|---|---|---|---|
| OFFLINE | IMPOSSIBLE | UNKNOWN | UNKNOWN |
| ONLINE | POSSIBLE | NOT IN SESSION | UNKNOWN |
| IN SESSION | POSSIBLE | IN SESSION | PARTICIPATION POSSIBLE |
| IN SESSION (COMPATIBLE) | POSSIBLE | IN SESSION | DIFFERENT VERSION BUT PARTICIPATION POSSIBLE |
| IN SESSION (DIFFERENT VERSION) | POSSIBLE | IN SESSION | DIFFERENT VERSION PARTICIPATION IMPOSSIBLE |

FIG.14

| LOCATION NAME | LOCATION COLOR | | | |
|---|---|---|---|---|
| | MAGENTA | CYAN | ORANGE | GREEN |
| CONFERENCE ROOM 1 | 192.0.0.1 (TOKYO 1) | 192.0.0.2 (TOKYO 2) | 192.0.0.3 (OSAKA 2) | 192.0.0.4 (FUKUOKA 1) |
| CONFERENCE ROOM 2 | 192.0.1.1 (HIROSHIMA 1) | 192.0.1.2 (SAPPORO 1) | | |
| CONFERENCE ROOM 3 | 192.0.2.1 (AKITA 1) | 192.0.2.2 (NAGOYA 1) | 192.0.2.3 (KANAZAWA 1) | |

FIG.15

| SEQ | OPERATION NAME | SENDER IP ADDRESS: Port No. | DESTINATION IP ADDRESS: Port No. | OPERATION TYPE | OPERATION OBJECT (PAGE DATA ID /STROKE DATA ID) | DATA |
|---|---|---|---|---|---|---|
| 1 | ADD | 192.0.0.1:50001 | 192.0.0.1:50000 | STROKE | p005 | ·····(STROKE DATA) |
| 2 | ADD | 192.0.0.1:50000 | 192.0.0.2:50001 | STROKE | p005 | ·····(STROKE DATA) |
| 3 | UPDATE | 192.0.0.2:50001 | 192.0.0.1:50000 | STROKE | s006 | (50,40) |
| 4 | UPDATE | 192.0.0.1:50000 | 192.0.0.1:50001 | STROKE | s006 | (50,40) |
| 5 | DELETE | 192.0.0.2:50001 | 192.0.0.1:50000 | STROKE | s007 | – |
| 6 | DELETE | 192.0.0.1:50000 | 192.0.0.1:50001 | STROKE | s007 | – |
| 7 | ADD | 192.0.0.1:50001 | 192.0.0.1:50000 | PAGE | – | – |
| 8 | ADD | 192.0.0.1:50000 | 192.0.0.2:50001 | PAGE | – | – |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ... | ... | ... | ... | ... | ... | ... |

FIG.19

| | Whiteboard Location Name | IP Address or Host Name | Group Name | |
|---|---|---|---|---|
| CO (9) | Conference Room 1 | 192.168.1.1 | group01 | |
| (13) | Conference Room 2 | 192.168.1.2 | group01 | |
| CO (10) | Conference Room 3 | 192.168.1.3 | group01 | |
| ⊘ | | v1master | group02 | |
| HQ (11) | Headquarters A | 10.60.70.35 | group02 | |
| (16) (14) | Headquarters B | iwb.example.com | group02 | |
| OF (12) | office 1 | 10.63.70.31 | group02 | |

(1) ○ To participate in remote whiteboard, please select whiteboard location name and press [Join] button.

(2) Contact List | Manual Entry

(15)
⊘ Online
In session
In session in compatible mode (5) Specify group name:

(6) IP Address — iwb.example.com (7) Join (8) Cancel $$[x, y, 1] \begin{pmatrix} \overset{\text{SCALING}}{\boxed{\begin{matrix} 3 & 0 \\ 0 & 1 \end{matrix}}} & \begin{matrix} 0 \\ 0 \end{matrix} \\ \underset{\text{TRANSLATION}}{\boxed{\begin{matrix} 3 & 4 \end{matrix}}} & 1 \end{pmatrix} = [3x+3, y+4, 1]$$

WHEN x=2, y=1

INFORMATION PROCESSING APPARATUS AND INFORMATION PROCESSING SYSTEM

BACKGROUND OF THE INVENTION

1. Field of the Invention

The present invention relates generally to an information processing apparatus and an information processing system, and particularly to an image processing system including a plurality of information processing apparatuses that share an image displayed on a display unit and are interconnected via a network.

2. Description of the Related Art

Interactive whiteboards (IWB) are used in conferences held by businesses, educational institutions, and governmental institutions, for example, to display a background image on a large display and enable users to draw stroke images such as characters, numbers, and diagrams on the background image. In such interactive whiteboards, stroke images generated by users on a touch panel may be displayed on the touch panel. The stroke image may be saved along with the background as page data, on a per-page basis, for example.

Also, with the advancement of network applications, techniques have been developed that involve connecting interactive whiteboards at various locations via a network to enable the interactive whiteboards to share images such as stroke images, for example (e.g. see Japanese Patent No. 5081088). Japanese Patent No. 5081088 discloses a mutual information sharing system that transmits location identification information along with input data such that location information of the operator that has input the data may be displayed alongside the input data, for example.

As described above, in the mutual information sharing system disclosed in Japanese Patent No. 5081088, data may be displayed along with location information of the location at which the data has been input by transmitting the data and the location information at the same time. However, the operational feel experienced by users of conventional information processing systems including the above mutual information sharing system has not necessarily been optimal.

SUMMARY OF THE INVENTION

According to one embodiment of the present invention, an information processing apparatus including a display unit that displays an image is provided. The image processing apparatus includes a determination unit configured to determine that an electronic pen or a pointer has come into contact with the display unit, and a display control unit configured to control the display unit to display a display corresponding to the pointer when the determination unit determines that the contact with the display unit has been made by the pointer.

BRIEF DESCRIPTION OF THE DRAWINGS

FIG. 6 is a table illustrating an exemplary data configuration of page data;

FIG. 8 is a table illustrating an exemplary data configuration of coordinates arrangement data;

FIG. 9 is a table illustrating an exemplary data configuration of media data;

FIG. 10 is a table illustrating an exemplary configuration of a remote license management table;

FIG. 11 is a table illustrating an exemplary configuration of an address book management table;

FIG. 12 illustrates an example of backup data;

FIG. 13A is a table illustrating an exemplary configuration of a connection destination management table;

FIG. 13B is a table illustrating connection statuses of connection destinations;

FIG. 14 is a table illustrating an exemplary configuration of a participating location management table;

FIG. 15 is a table illustrating an exemplary data configuration of operation data;

FIG. 19 illustrates an exemplary screen including a location list that may be displayed at a display of a participating apparatus;

DESCRIPTION OF THE PREFERRED EMBODIMENTS

In the following, embodiments of the present invention are described with reference to the accompanying drawings.

First Embodiment

<System Configuration>

Figure 1:
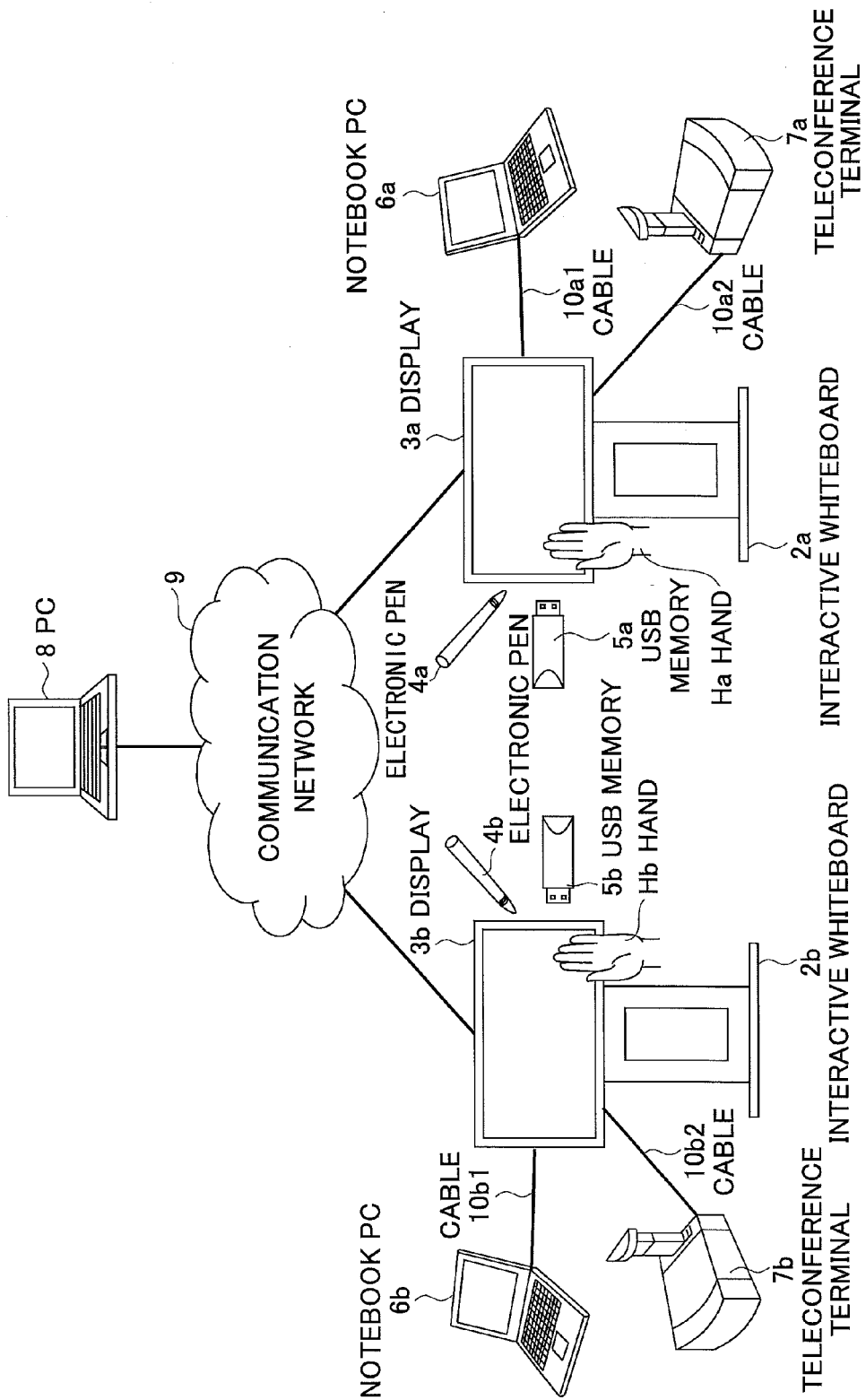
FIG. 1 illustrates an exemplary overall configuration of an image processing system according to an embodiment of the present invention.

FIG. 1 illustrates an exemplary overall configuration of an image processing system according to an embodiment of the present invention. Note that in the image processing system 1 of FIG. 1, for ease of description, only two interactive whiteboards 2*a* and 2*b* and their accompanying electronic pens 4*a* and 4*b* are illustrated. However, the image processing system of the present embodiment may include three or more interactive whiteboards and electronic pens. Note, also, that the interactive whiteboards 2a and 2b are exemplary embodiments of an information processing apparatus of the present invention.

As illustrated in FIG. 1, the image processing system 1 includes the interactive whiteboards 2a and 2b, the electronic pens 4a and 4b, USB memories 5a and 5b, notebook PCs (personal computers) 6a and 6b, teleconference (video conference) terminals 7a and 7b, and a PC 8. The interactive whiteboards 2a and 2b and the PC 8 are interconnected via a communication network 9. Also, displays 3a and 3b are arranged at the interactive whiteboards 2a and 2b, respectively.

The interactive whiteboard 2a is capable of displaying on the display 3a an image drawn by an event generated by the electronic pen 4a (e.g. pen tip or pen end of the electronic pen 4a touching the display 3a). In addition to the electronic pen 4a, the interactive whiteboard 2a is capable of changing an image displayed on the display 3a based on an event generated by a hand Ha of a user (e.g. gesture such as enlarging/reducing an image, or turning a page).

Also, the USB memory 5a may be connected to the interactive whiteboard 2a, and the interactive whiteboard 2a may read an electronic file such as a PDF file from the USB memory 5a or record an electronic file in the USB memory 5a, for example. Further, the notebook PC 6a is connected to the interactive whiteboard 2a via a cable 10a1 that enables communication according to a standard such as Display Port, DVI (Digital Visual Interface), HDMI (High-Definition Multimedia Interface; registered trademark), and VGA (Video Graphics Array). When an event such as the touching of the display 3a occurs at the interactive whiteboard 2a, the interactive whiteboard 2a handles the event in a manner similar to an event of an input device such as a keyboard or a mouse and transmits event information relating to the event to the notebook PC 6a. The teleconference (video conference) terminal 7a is similarly connected to the interactive whiteboard 2a via a cable 10a2 that enables communication according to the above standards. Note that the notebook PC 6a and the teleconference terminal 7a may alternatively establish wireless communication with the interactive whiteboard 2a according to any of the various wireless communication protocols such as Bluetooth (registered trademark).

On the other hand, at a different location where the interactive whiteboard 2b is arranged, the interactive whiteboard 2b including the display 3b, the electronic pen 4b, the USB memory 5b, the notebook PC 6b, the teleconference terminal 7b, a cable 10b1, and a cable 10b2 are similarly used in the manner described above. Further, an image displayed on the display 3b may be changed based on an event generated by a hand Hb of a user of the interactive whiteboard 2b, for example.

In this way, an image drawn on the display 3a of the interactive whiteboard 2a at a first location may also be displayed on the display 3b of the interactive whiteboard 2b at a second location. Also, an image drawn on the display 3b of the interactive whiteboard 2b at the second location may also be displayed at the display 3a of the interactive whiteboard 2a at the first location. That is, in the image processing system 1, a remote sharing process may be performed that involves sharing the same image at remote locations. The image processing system 1 may thus be conveniently used to hold conferences at remote locations; for example.

Note that in the following descriptions, the designation "interactive whiteboard 2" may be used to refer to any one of a plurality of interactive whiteboards. The designation "display 3" may be used to refer to any one of a plurality of displays. The designation "electronic pen 4" may be used to refer to any one of a plurality of electronic pens. The designation "USB memory 5" may be used to refer to any one of a plurality of USB memories. The designation "notebook PC 6" may be used to refer to any one of a plurality of notebook PCs. The designation "teleconference terminal 7" may be used to refer to any one of a plurality of teleconference terminals. The designation "hand H" may be used to refer to any one of the hands of a plurality of users. The designation "cable 10" may be used to refer to any one of a plurality of cables.

Further, note that in the present exemplary embodiment, an interactive whiteboard is described as an example of an information processing apparatus. However, an information processing apparatus of the present invention is not limited to the above, and as other examples of the information processing apparatus, an electronic signboard (digital signage), a telestrator (video marker) used in sports and weather broadcasts, for example, and a remote image (video) diagnostic apparatus may be used. Also, although the notebook PC 6 is described as an example of an information processing terminal, other examples of the information processing terminal include a desktop PC, a tablet PC, a smartphone, a PDA (personal digital assistance), a digital video camera, a digital camera, a game machine, and other types of terminals that are capable of rendering an image frame. Further, the communication network 9 may include the Internet, a LAN (Local Area Network), a mobile phone communication network, and the like. Further, in the present exemplary embodiment, the USB memory 5 is described as an example of a recording medium. However, the present invention is not limited to the above, and as other examples of the recording medium, a variety of recording media such as an SD card may be used.

<Hardware Configuration of Interactive Whiteboard>

Figure 2:
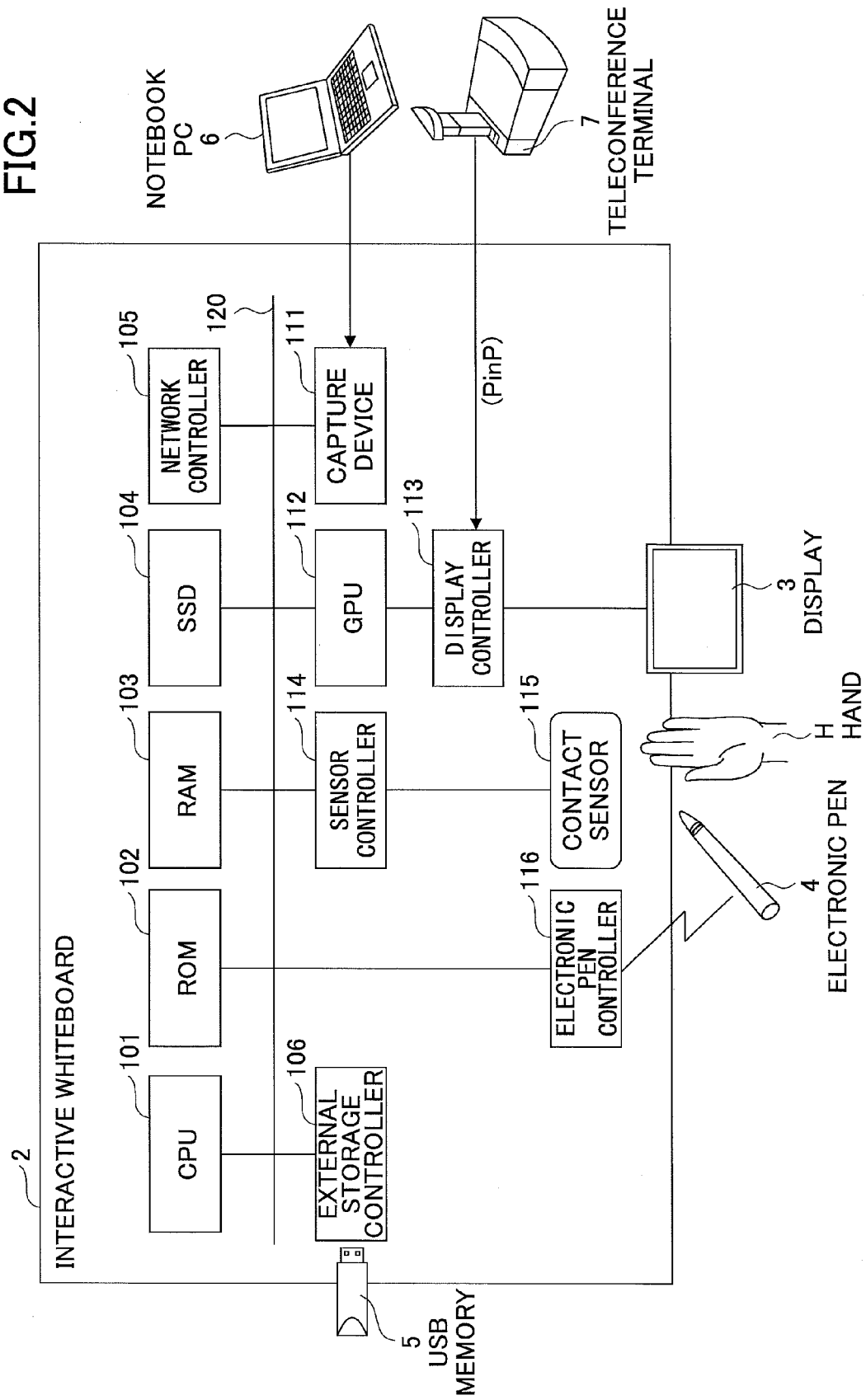
FIG. 2 illustrates an exemplary hardware configuration of an interactive whiteboard according to an embodiment of the present invention.

In the following, a hardware configuration of the interactive whiteboard 2 according to the present embodiment is described with reference to FIG. 2. FIG. 2 is a block diagram illustrating an exemplary hardware configuration of the interactive whiteboard 2.

As illustrated in FIG. 2, the interactive whiteboard 2 includes a CPU 101 that controls overall operations of the interactive whiteboard 2, a ROM 102 that stores programs such as an IPL (initial program loader) used for activating the CPU 101, a RAM 103 that is used as a work area of the CPU 101, a SSD (solid-state drive) 104 that stores various data and programs such as a program for the interactive whiteboard 2, a network controller 105 that controls communication with the communication network 9, and an external storage controller 106 that controls communication with the USB memory 5.

The interactive whiteboard 2 also includes a capture device 111 that captures a still image or a moving image (video) being displayed on a display of the notebook PC 6, a GPU (Graphics Processing Unit) 112 dedicated to handling graphics, and a display controller 113 that controls and manages screen display operations for displaying an output image from the GPU to the display 3 or the teleconference terminal 7.

The interactive whiteboard 2 further includes a sensor controller 114 that controls process operations of a contact sensor 115, and the contact sensor 115 that detects the contact of an object such as the electronic pen 4 or the hand H of the user with the display 3. The contact sensor 115 is an infrared sensor that detects an input and the coordinates of the input. The contact sensor 115 detects the coordinates of an input by having two light emitting/receiving units (not shown) arranged at two upper side edges of the display 3 emit a plurality of infrared light beams in a direction parallel to the display 3, having reflecting members arranged around the display 3 reflect the emitted light, and having light receiving elements of the light emitting/receiving units receive the light reflected by the reflecting members and returning via the same light path as the emitted light. The contact sensor 115 outputs to the sensor controller 114 an ID of the infrared light beam emitted by the two light emitting/receiving units that is shielded by an object, and the sensor controller 114 determines the coordinates of the contact position of the object. Note that IDs that are described below are examples of identification information.

Note that the contact sensor 115 is not limited to an infrared sensor as described above, but may be various other types of detection units including a capacitive touch panel that determines a contact position by detecting a change in capacitance, a resistive touch panel that detects a contact position by detecting a voltage change of two opposing resistance films, and an electromagnetic induction touch panel that determines a contact position by detecting an electromagnetic induction resulting from a contact object coming into contact with a display unit.

Also, the interactive whiteboard 2 includes an electronic pen controller 116. The electronic pen controller 116 communicates with the electronic pen 4 to determine whether a pen tip or a pen end of the electronic pen 4 is touching the display 3. Note that in some embodiments, in addition to detecting a touch at the pen tip and the pen end of the electronic pen 4, the electronic pen controller 116 may be configured to detect whether other parts of the electronic pen 4 such as a grip part to be gripped by a user is in contact with the display 3.

Further, the interactive whiteboard 2 includes a bus line 120 such as an address bus or a data bus for establishing electrical connection between the CPU 101, the ROM 102, the RAM 103, the SSD 104, the network controller 105, the external memory controller 106, the capture device 111, the GPU 112, the sensor controller 114, and the electronic pen controller 116 as illustrated in FIG. 2.

Note that in some embodiments, the program for the interactive whiteboard 2 may be recorded on a computer-readable recording medium such as a CD-ROM and distributed as a program product, for example.

<Functional Configuration of Interactive Whiteboard>

Figure 3:
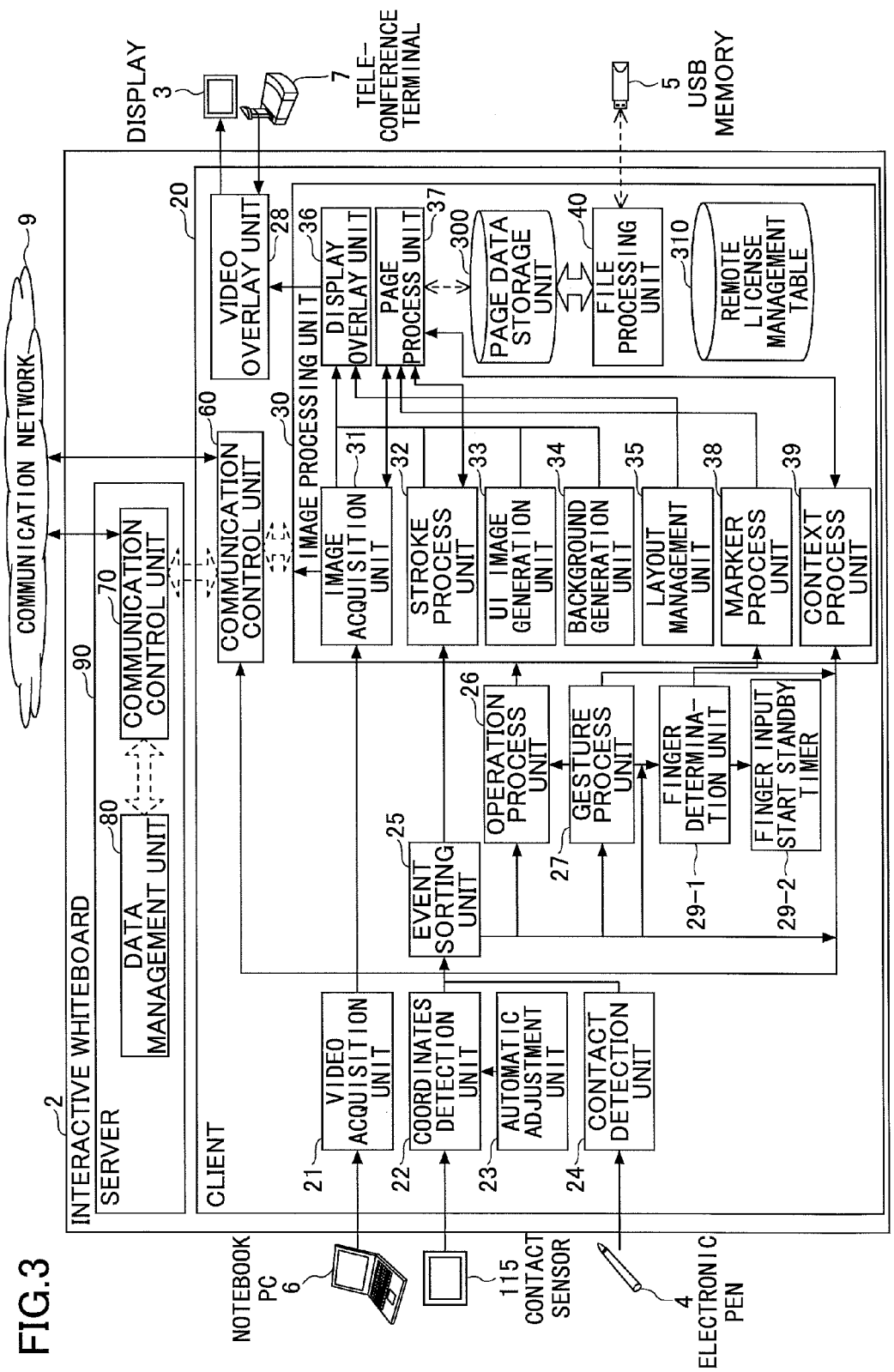
FIG. 3 is a block diagram illustrating an exemplary functional configuration of the interactive whiteboard according to an embodiment of the present invention.

In the following, a functional configuration of the interactive whiteboard 2 according to the present embodiment is described with reference to FIGS. 3-16. FIG. 3 is a block diagram illustrating an overall functional configuration of the interactive whiteboard 2.

Note that the functional elements of the interactive whiteboard 2 illustrated in FIG. 3 may be implemented by one or more of the hardware elements illustrated in FIG. 2 executing relevant programs. The interactive whiteboard 2 may act as a "host apparatus" that initiates a remote sharing process as well as a "participating apparatus" that joins a remote sharing process that has already been started. The interactive whiteboard 2 includes a client 20 and a server 90 as its main functional units. That is, the client 20 and the server 90 are included within the housing of the interactive whiteboard 2, and the functions of the client 20 and the server 90 are implemented within the housing of the interactive whiteboard 2. When the interactive whiteboard 2 acts as a host apparatus, the functions of the client 20 and the server 90 are implemented. When the interactive whiteboard 2 acts as a participating apparatus, the function of the client 20 is implemented, but the function of the server 90 is not implemented within the interactive whiteboard 2. For example, in FIG. 1, if the interactive whiteboard 2a acts as the host apparatus and the interactive whiteboard 2b acts as the participating apparatus, the client 20 of the interactive whiteboard 2a establishes communication with the client 20 of the counterpart interactive whiteboard 2b via the server 90 implemented within the interactive whiteboard 2a. On the other hand, the client 20 of the interactive whiteboard 2b establishes communication with the client 20 of the counterpart interactive whiteboard 2a via the server 90 implemented within the counterpart interactive whiteboard 2a.

[Functional Configuration of Client]

Figure 4:
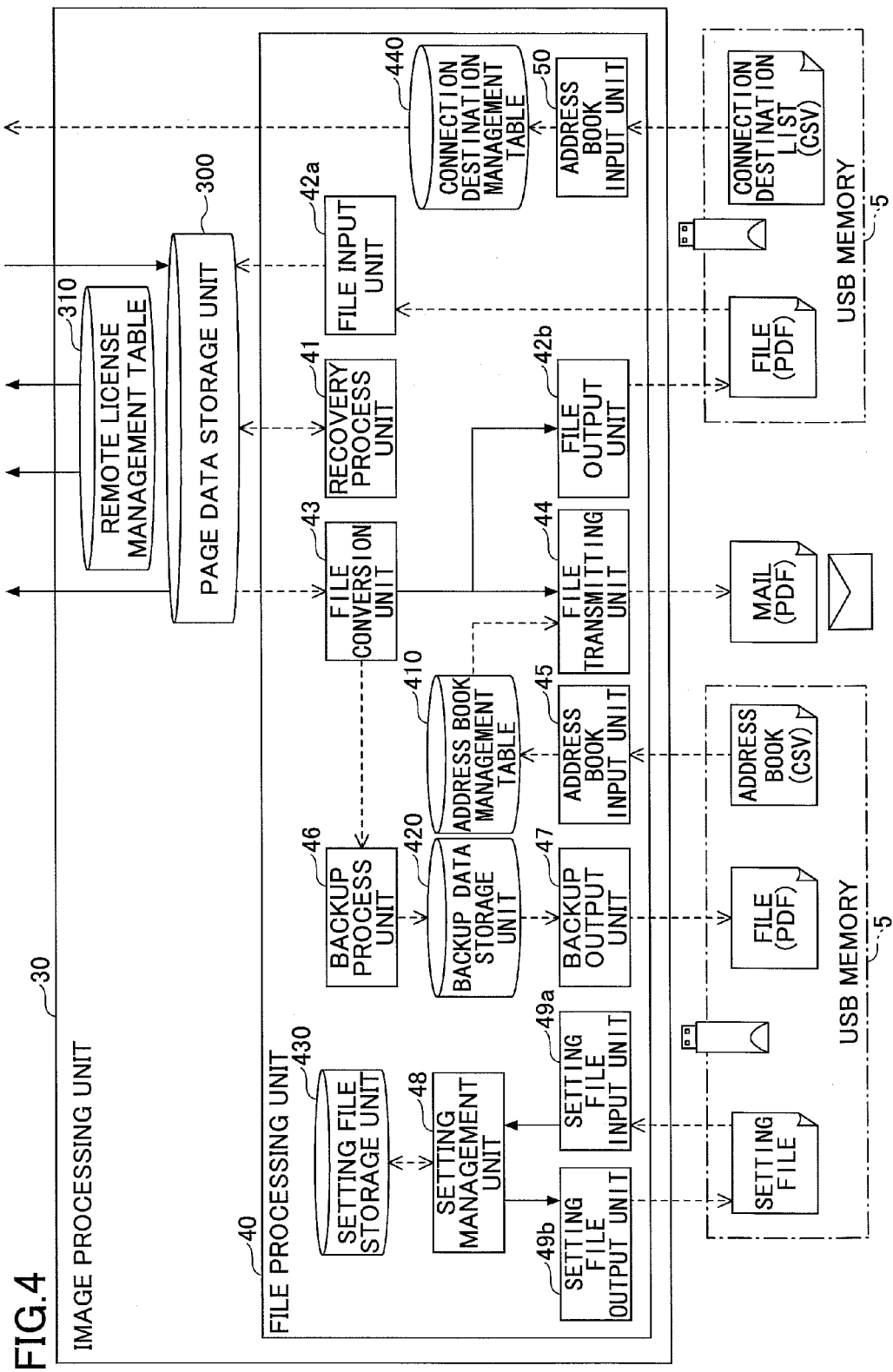
FIG. 4 is a block diagram illustrating an exemplary functional configuration of a file processing unit.
Figure 5:
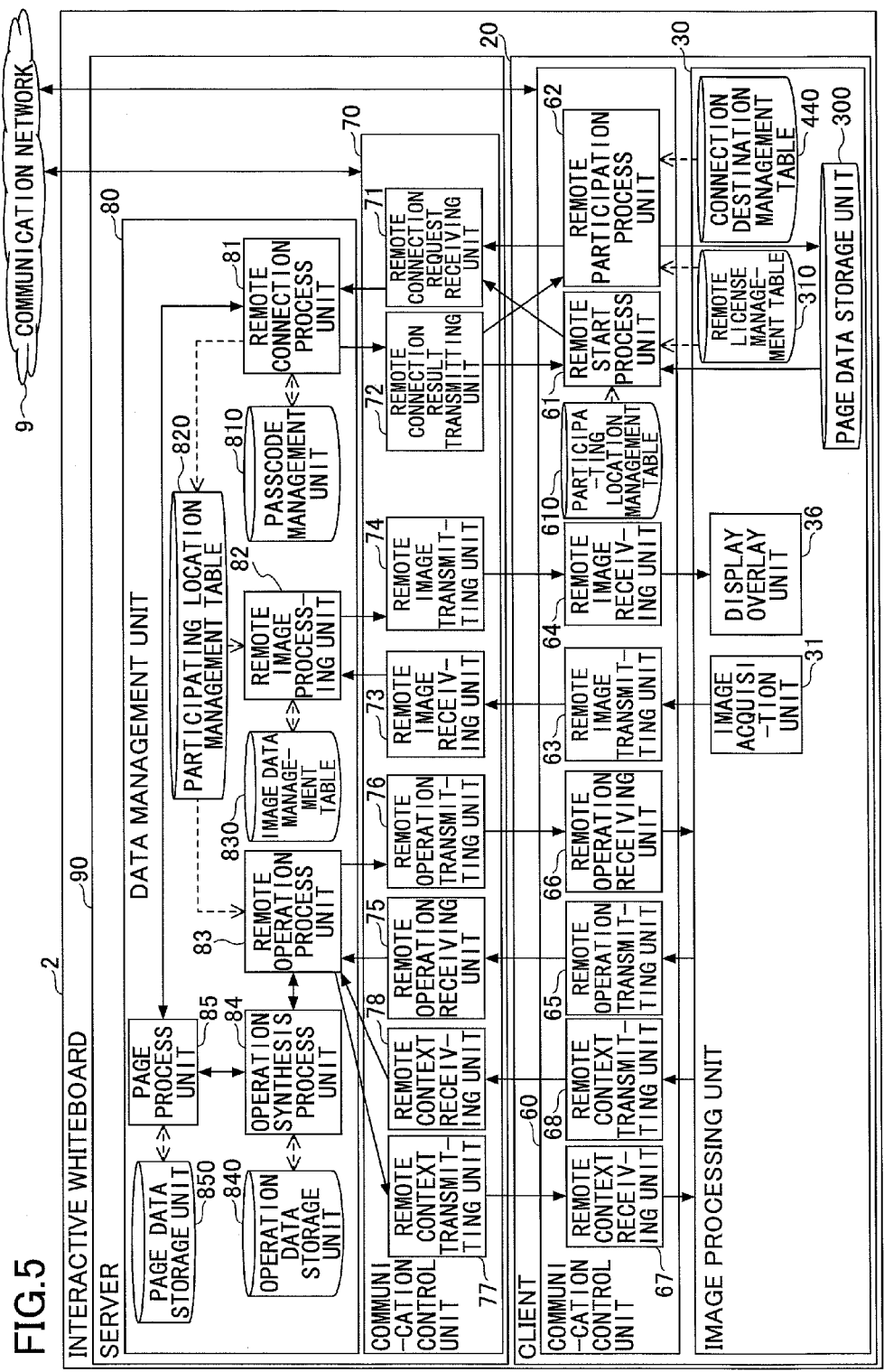
FIG. 5 is a block diagram illustrating an exemplary functional configuration of a communication control unit.

In the following, a functional configuration of the client 20 is described with reference to FIGS. 3-5. As illustrated in FIG. 3, the client 20 includes a video acquisition unit 21, a coordinates detection unit 22, an automatic adjustment unit 23, a contact detection unit 24, an event sorting unit 25, an operation process unit 26, a gesture process unit 27, a video overlay unit 28, a finger determination unit 29-1, a finger input start standby timer 29-2, an image processing unit 30, and a communication control unit 60.

The video acquisition unit 21 acquires an output video from a video output device such as the notebook PC 6 that is connected to the cable 10. Upon receiving an image signal from the video output device (e.g. notebook PC 6), the video acquisition unit 21 analyzes the received image signal, derives image information such as the resolution of an image frame corresponding to a display image of the video output device to be formed by the image signal and the update frequency of the image frame, and outputs the image information to an image acquisition unit 31 of the image processing unit 30.

The coordinates detection unit 22 detects the coordinates of an event generated by a user on the display 3 (operation such as the hand H of the user touching the display 3). The coordinates detection unit 22 also detects an area of a touched region.

The automatic adjustment unit 23 is activated when the interactive whiteboard 2 is activated and is configured to adjust parameters of an image process of an optical sensor camera of the contact sensor 115 so that the contact sensor 115 may output appropriate values to the coordinates detection unit 22.

The contact detection unit 24 detects an event generated by the user (operation such as pressing (touching) of the pen tip or the pen end of the electronic pen 4 on the display 3).

The event sorting unit 25 sorts the coordinates of events detected by the coordinates detection unit 22 and the detection results of detections made by the contact detection unit 24 into various events including stroke drawing, a UI (user interface) operation, and a gesture operation, for example.

Figure 16:
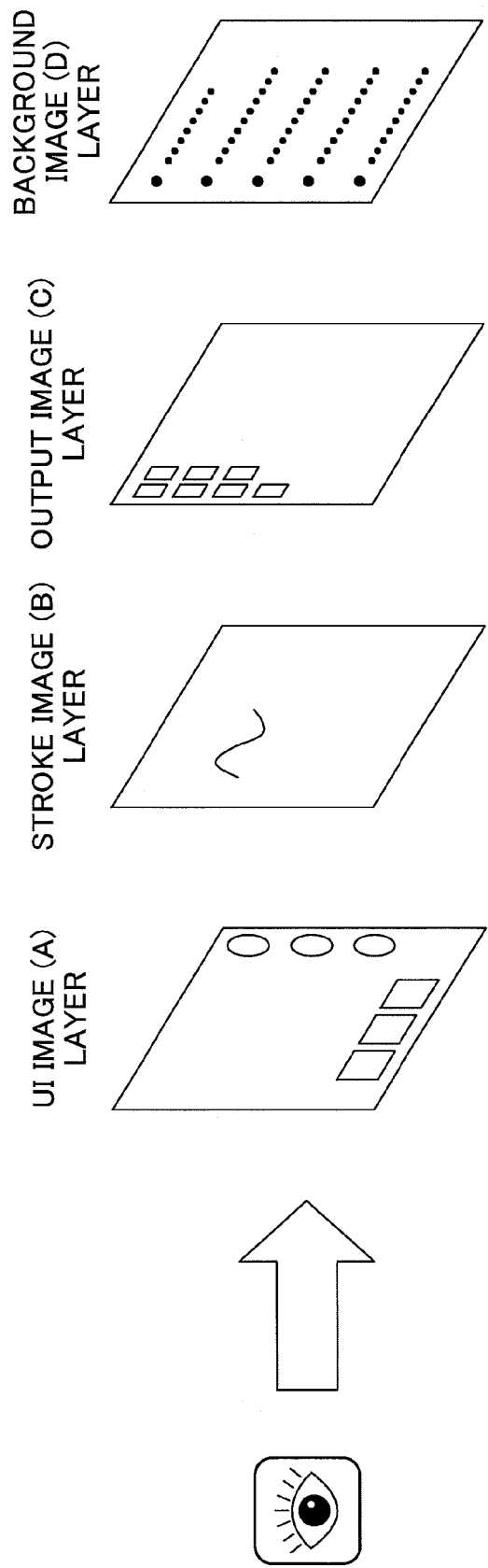
FIG. 16 illustrates image layers that may be combined to generate an overlay image.

Note that "stroke drawing" is an event that occurs when a stroke image (B) as illustrated in FIG. 16 (described later) is displayed on the display 3. Stroke drawing involves the user pressing the electronic pen 4 on the display 3, moving the electronic pen 4 in the pressed state, and ultimately detaching the electronic pen 4 from the display 3. For example, letters of the alphabet such as "S" or "T" may be drawn on the display 3 by stroke drawing. Note that stroke drawing is not limited to drawing an image but includes other various events such as deleting a drawn image and editing a drawn image, for example.

"UI operation" is an event that occurs when a UI image (A) as illustrated in FIG. 16 (described later) is displayed on the display 3. UI operation involves the user pressing a predetermined position with the electronic pen 4 or the hand H. For example, the width or color of a line drawn by the electronic pen 4 may be designated by the UI operation.

"Gesture operation" is an event that occurs when the stroke image (B) as illustrated in FIG. 16 is displayed on the display 3. Gesture operation involves the user touching or moving the hand H on the display 3. For example, an image may be enlarged (or reduced), a display region may be changed, or a page may be turned by a gesture operation involving the user touching the display 3 with the hand H and moving the hand H along the display 3.

When the event sorting unit 25 determines that an event corresponds to a UI operation, the operation process unit 26 executes various operations according to a UI element associated with the generated event. The UI element may be a button, a list, a checkbox, or a textbox, for example. When the event sorting unit 25 determines that an event corresponds to a gesture operation, the gesture process unit 27 determines the gesture content of the gesture operation based on the history of coordinates detected by the coordinates detection unit 22, for example, and generates a corresponding gesture event.

The finger determination unit 29-1 is used for determining when a contact corresponds to a finger touching a screen. The coordinates detection unit 22 detects coordinates using infrared sensing and triangulation. Accordingly, the coordinates detection unit 22 is capable of detecting a contact made by an object other than the electronic pen 4. Thus, the finger determination unit 29-1 determines whether a contact corresponds to that made by the electronic pen 4, or a contact made by some other object that is used as a pointer. Note that although the finger is described as an example of a pointer corresponding to an object other than the electronic pen 4 used to make contact with the display 3, infrared light beams may be shielded by other objects as well. Note, also, that the finger determination unit 29-1 is an exemplary embodiment of a determination unit of the present invention.

To determine whether a finger contact has been made, the finger determination unit 29-1 acquires a contact detection image event from the event sorting unit 25. The contact detection image event corresponds to an event of detecting light shielding within a detection area (area several centimeters below the screen and parallel to the screen) of the contact sensor 115. The finger determination unit 29-1 may also acquire a pen-down event from the event sorting unit 25. The pen-down event corresponds to an event involving the contact detection unit 24 detecting a touch by the pen tip or pen end of the electronic pen 4. Further, the finger determination unit 29-1 may acquire a gesture event from the gesture process unit 27.

The finger determination unit 29-1 starts a time measurement operation (counting) by the finger input start standby timer 29-2 based on whether a contact detection image event, a pen-down event, and/or a gesture event is acquired, and also based on the image size of the image event. Further, when the finger input start standby timer 29-2 starts counting, the finger determination unit 29-1 queues (stores) coordinates in chronological order. Note that in the present embodiment, the finger input start standby timer 29-2 acts as a time measurement unit of the present invention, and the finger determination unit 29-1 acts as a coordinate storage unit of the present invention.

When the finger input start standby timer 29-2 counts the time at least up to a predetermined time period, the finger determination unit 29-1 determines that a drawing is being made with a finger, and transmits the queued coordinates to a marker process unit 38. The marker process unit 38 draws the series of coordinates as a marker, and continues drawing the marker by drawing subsequently acquired coordinates as coordinates at the end of the marker. Note that the marker process unit 38 is an exemplary embodiment of a display control unit of the present invention that is configured to display a display corresponding to a pointer, and the marker is an exemplary embodiment of the display corresponding to the pointer.

As described above, when the finger determination unit 29-1 determines that a finger is used to make a drawing (marker event), the marker process unit 38 draws a marker. On the other hand, when the finger determination unit 29-1 determines that the electronic pen 4 is used to make a drawing (pen down event), a stroke process unit 32 draws a stroke. Note that a stroke is an exemplary embodiment of a display corresponding to the electronic pen of the present invention. In the following descriptions, a determination by the finger determination unit 29-1 that a finger is used to make a drawing may be referred to as the detection of a marker event.

The finger determination unit 29-1, the finger input start standby timer 29-2, and the marker process unit 38 are described above because the marker event is included in a remote context of the present embodiment (described below). Note that the above elements are described in greater detail in connection with a second embodiment of the present invention.

The video overlay unit 28 displays on a video output device (display 3) an image overlaid by a display overlay unit 36 (described below). Also, the video overlay unit 28 creates a picture-in-picture overlay image by combining video from a video output device (e.g. notebook PC 6) with video sent from another video output device (e.g. teleconference terminal 7). Further, the video overlay unit 28 performs switching operations for switching a picture-in-picture video displayed within a portion of the display 3 to full display over the entire display 3.

The image processing unit 30 performs various image processes such as overlaying multiple image layers. Note that specific image overlay examples are described below with reference to FIG. 16. The image processing unit 30 includes the image acquisition unit 31, the stroke process unit 32, a UI image generation unit 33, a background generation unit 34, a layout management unit 35, the marker process unit 38, a context process unit 39, the display overlay unit 36, a page process unit 37, a file processing unit 40, a page data storage unit 300, and a remote license management table 310.

The image acquisition unit 31 acquires each frame of the video acquired by the video acquisition unit 21 as an image. This image corresponds to an output image (C) from a video output device (e.g. notebook PC 6) as illustrated in FIG. 16.

The stroke process unit 32 executes a relevant process such as drawing an image, deleting a drawn image, or editing a drawn image based on an event that has been sorted by the event sorting unit 25 as a stroke drawing event. The image generated by the stroke drawing corresponds to the stroke image (B) as illustrated in FIG. 16. Also, as described in detail below, the results of drawing, deleting, and editing an image based on a stroke drawing event are stored as operation data in an operation data storage unit 840 (see FIG. 5).

The UI image generation unit 33 generates a UI (user interface) image that is set up in advance in the interactive whiteboard 2. The UI image corresponds to a UI image (A) as illustrated in FIG. 16.

The background generation unit 34 receives from the page process unit 37 media data included in page data retrieved from the page data storage unit 300 by the page process unit 37. The background generation unit 34 outputs the received media data to the display overlay unit 36. Note that an image represented by the media data corresponds to a background image (D) as illustrated in FIG. 16. A pattern of the background image (D) may be a solid color or a grid display, for example.

The layout management unit 35 manages layout information for the display overlay unit 36. The layout information may represent the layout of images output from the image acquisition unit 31, the stroke process unit 32, and the UI image generation unit 33 (or the background generation unit 34), for example. In this way, the layout management unit 35 may provide directions to the display overlay unit 36 concerning the display positions of the output image (C) and the stroke image (B) within the UI image (A) and the background image (D), and directions on whether to display/hide these images, for example.

The context process unit 39 transmits a marker event, a gesture event, a page creation/deletion event, and a file reading event to the server 90 via a remote context transmitting unit 68 of the communication control unit 60. Also, the context process unit 39 acquires a marker event, a gesture event, a page creation/deletion event, and a file reading event from a remote context receiving unit 67 of the communication control unit 60. Further, the context process unit 39 acquires a remote location participation event and a remote location exit event from a participating location management table 610 of the communication control unit 60. The context process unit 39 generates a location image according to the acquired event and location information and displays the generated location image on the display 3. Note that the page creation/deletion event occurs when the user performs a page creation operation or a page deletion operation with respect to a UI image. The file reading event occurs when a file input unit 42a reads a file. The remote location exit event occurs when a location is deleted from the participating location management table 610.

The display overlay unit 36 lays out (arranges) the images output from the image acquisition unit 31, the stroke process unit 32, the UI image generation unit 33, the background generation unit 34, and the marker process unit 38 based on the layout information output from the layout management unit 35.

Page process unit 37 combines data of the stroke image (B) and data of the output image (C) into one set of page data and stores the page data in the page data storage unit 300. For example, the data of the stroke image (B) may correspond to stroke arrangement data (stroke data) represented by stroke arrangement data IDs of the page data illustrated in FIG. 6, and the data of the output image (C) may correspond to media data represented by media data IDs of the page data illustrated in FIG. 6. Note that when media data of page data is read from the page data storage unit 300, the media data is handled as data of the background image (D).

Also, the page process unit 37 may transmit media data of the page data that is once stored to the display overlay unit 36 via the background generation unit 34 so that the video overlay unit 28 may redisplay the media data on the display 3. Also, the page process unit 37 may return the stroke arrangement data (stroke data) of the page data to the stroke process unit 32 in order to enable re-editing of the stroke. Further, the page process unit 37 may delete or replicate the page data, for example.

That is, when storing page data in the page data storage unit 300, the page process unit 37 stores the data of the output image (C) displayed on the display 3 at the time in the page data storage unit 300, and when the stored data is read from the page data storage unit 300 thereafter, the stored data is handled as media data representing the background image (D). The page process unit 37 outputs the stroke arrangement data representing the stroke image (B) of the page data read from the page data storage unit 300 to the stroke process unit 32. Also, the page process unit 37 outputs media data representing the background image (D) of the page data read from the page data storage unit 300 to the background generation unit 34.

The display overlay unit 36 overlays the output image (C) from the image acquisition unit 31, the stroke image (B) from the stroke process unit 32, the UI image (A) from the UI image generation unit 33, and the background image (D) from the background generation unit 34 according to the layout specified by the layout management unit 35. In this way, the UI image (A), the stroke image (B), the output image (C), and the background image (D) (also simply referred to as "image (A)", "image (B)", "image (C)", and "image (D)" hereinafter) may be layered in the appropriate order as illustrated in FIG. 16 such that the user may be able to view the image contents even when the images are overlaid.

Also, the display overlay unit 36 may overlay either the output image (C) or the background image (D) of FIG. 16 on the UI image (A) and the stroke image (B) by switching between the images (C) and (D). For example, in a case where the image (A), the image (B), and the image (C) are initially displayed, and the cable 10 between the interactive whiteboard 2 and the video output device (e.g. notebook PC 6) is unplugged, the layout management unit 35 may direct the display overlay unit 36 to exclude the image (C) from the overlaid images and display the image (D) instead. The display overlay unit 36 may also perform operations such as expansion of the display, reduction of the display, and moving the display region, for example.

The page data storage unit 300 stores page data as illustrated in FIG. 6. FIG. 6 is a table illustrating an exemplary data configuration of page data. Page data corresponds to data of one page (stroke arrangement data (stroke data) and media data) to be displayed on the display 3. Note that because a wide range of parameters are included in the page data, the contents of the page data are described below with reference to FIGS. 6-9.

As illustrated in FIG. 6, page data includes various items of information stored in association with each other such as a page data ID for identifying a page, a start time indicting the time display of the page has started, an end time indicating the time rewriting of the page through stroke drawing and/or gesture operations, for example, has ended, a stroke arrangement data ID for identifying stroke arrangement data of a stroke generated by the electronic pen 4 or the hand H, and a media data ID for identifying media data. The stroke arrangement data corresponds to data for displaying the stroke image (B) of FIG. 16 on the display 3 as described in detail below. Media data corresponds to data for displaying the background image (D) of FIG. 16 on the display 3 (D) as described in detail below.

For example, in a case where the a letter of the alphabet "S" is drawn by the user using the electronic pen 4, because the letter "S" can be written with one stroke, the single letter "S" is represented by one stroke ID. On the other hand, in a case where a letter of the alphabet "T" is drawn by the user using the electronic pen 4, because the letter "T" is written with two strokes, the single letter "T" is represented by two stroke IDs.

Figure 7:
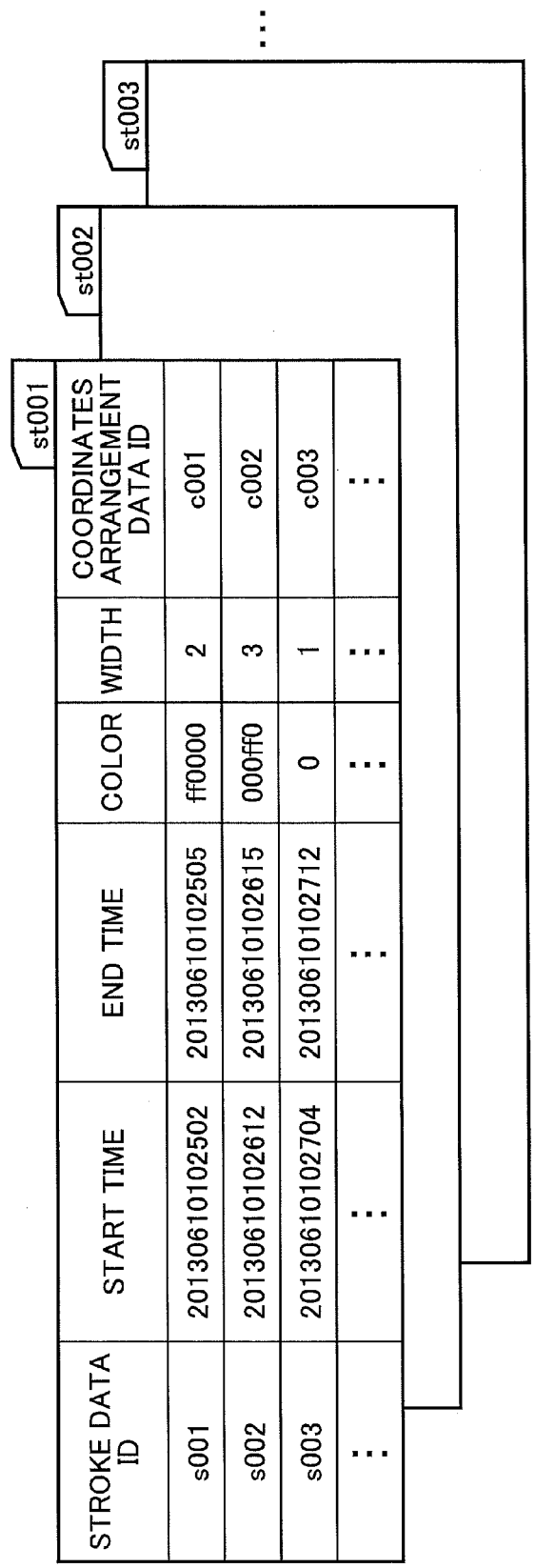
FIG. 7 is a table illustrating an exemplary data configuration of stroke arrangement data.

The stroke arrangement data may include detailed information as illustrated in FIG. 7, for example. FIG. 7 is a table illustrating an exemplary data configuration of the stroke arrangement data. As illustrated in FIG. 7, one set of stroke arrangement data may include a plurality of sets of stroke data. One set of stroke data includes a stroke ID for identifying the stroke data, a start time indicating the time writing of the stroke of the stroke data has started, an end time indicating the time writing of the stroke has ended, a stroke color, a stroke width, and a coordinates arrangement data ID for identifying coordinates arrangement data representing the arrangement of pass points of the stroke.

Figure 8:
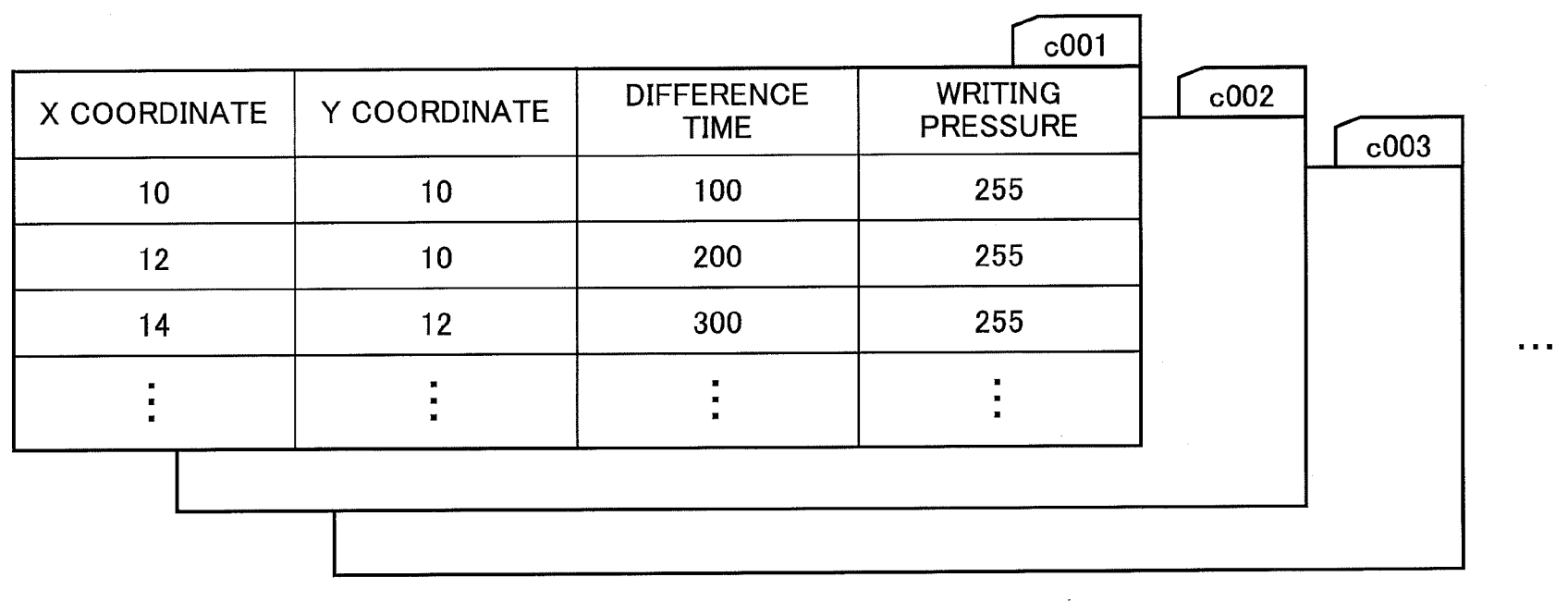

The coordinates arrangement data may include detailed information as illustrated in FIG. 8, for example. FIG. 8 is a table illustrating an exemplary data configuration of the coordinates arrangement data. As illustrated in FIG. 8, the coordinates arrangement data includes information on a point (X coordinate and Y coordinate) on the display 3, a difference time (ms) indicating the difference between the start time and the time the stroke passes this point, and a pen pressure of the electronic pen at this point.

That is, one item of the coordinates arrangement data illustrated in FIG. 7 represents a collection of points as illustrated in FIG. 8. For example, in the case where the user draws a letter of the alphabet "S" using the electronic pen 4, the letter "S" may be drawn in one stroke, but the stroke passes through a plurality of points from the start to end of drawing the stroke. Thus, the coordinates arrangement data of the stroke includes information of these points.

The media data of the page data illustrated in FIG. 6 may include detailed information as illustrated in FIG. 9, for example. FIG. 9 is a table illustrating an exemplary data configuration of the media data. As illustrated in FIG. 9, the media data includes various items of information stored in association with each other such as the media data ID corresponding to the media data ID included in the page data of FIG. 6, a data type of the media data, a recording time indicating the time the page data was stored in the page data storage unit 300 by the page process unit 37, an image position (X coordinate and Y coordinate) and an image size (width and height) of the image to be displayed on the display 3 by the page data, and data indicating the content of the media data. Note that the image position of the image to be displayed on the display 3 in the page data represents the upper left edge position of the image to be displayed assuming the coordinates (X coordinate, Y coordinate) of the upper left edge of the display 3 is (X, Y)=(0, 0).

Referring back to FIG. 3, the remote license management table 310 manages license data that is used for executing a remote sharing process. As illustrated in FIG. 10, the remote license management table 310 stores a product ID of the interactive whiteboard 2, a license ID used for authentication, and a license expiration date in association with each other.

(Functional Configuration of File Processing Unit)

In the following, a functional configuration of the file processing unit 40 is described with reference to FIG. 4. FIG. 4 is a block diagram illustrating an exemplary functional configuration of the file processing unit 40. Note that in the following descriptions, the interactive whiteboard 2 that initiates a remote sharing process is referred to as "host apparatus", and the interactive whiteboard 2 that participates in (joins) a remote sharing process that has already been started is referred to as "participating apparatus".

The file processing unit 40 includes a recovery process unit 41, the file input unit 42a, a file output unit 42b, a file conversion unit 43, a file transmitting unit 44, an address book input unit 45, a backup process unit 46, a backup output unit 47, a setting management unit 48, a setting file input unit 49a, and a setting file output unit 49b. The file processing unit 40 further includes an address book management table 410, a backup data storage unit 420, a setting file storage unit 430, and a connection destination management table 440.

The recovery process unit 41 detects an abnormal termination of the interactive whiteboard 2, and when this occurs, the recovery process unit 41 recovers page data that has not been properly stored. For example, when the interactive whiteboard 2 is terminated under normal circumstances, page data is stored as a PDF file in the USB memory 5 via the file processing unit 40. However, when the interactive whiteboard 2 is terminated abnormally due to power failure, for example, the page data is stored in the page data storage unit 300 but not in the USB memory 5. Thus, when the power is turned back on, the recovery process unit 41 recovers the page data by retrieving the page data from the page data storage unit 300 and storing the retrieved page data in the USB memory 5.

The file input unit 42a reads a PDF file from the USB memory 5 and stores page data of each page of the PDF file in the page data storage unit 300.

The file conversion unit 43 converts the page data stored in the page data storage unit 300 into a PDF file.

The file output unit 42b stores the PDF file that is output by the file conversion unit 43 in the USB memory 5.

The file transmitting unit 44 attaches the PDF file generated by the file conversion unit 43 to an email and transmits the email. The destination of the file may be determined by having the display overlay unit 36 display contents of the address book management table 410 on the display 3, and having the file transmitting unit 44 accept a user selection of the destination through a user operation of an input unit such as a touch panel, for example. As illustrated in FIG. 11, the address book management table 410 stores a name and an email address of a destination in association with each other. Further, the file transmitting unit 44 may receive an input of the destination email address through a user operation of an input unit such as a touch panel, for example.

The address book input unit 45 reads an email address list file from the USB memory 5 and manages the read email address list file in the address book management table 410.

The backup process unit 46 performs a backup process by storing a file output by the file output unit 42b or a file transmitted by the file transmitting unit 44 in the backup data storage unit 420 as backup data. Note that the backup process may not be performed unless the user specifically sets up the backup process unit 46 to perform a backup process, for example. The backup data may be stored in PDF format as illustrated in FIG. 12, for example.

The backup output unit 47 stores the backup file in the USB memory 5. Upon storing the backup file, the user may be prompted to input a password for security purposes through operation of an input unit such as a touch panel, for example.

The setting management unit 48 manages various settings of the interactive whiteboard 2 by reading setting information of the interactive whiteboard 2 stored in the setting file storage unit 430, for example. The setting information of the interactive whiteboard 2 may include, for example, network settings, time/date settings, region/language settings, mail server settings, address book settings, connection destination list settings, and/or backup related settings. Note that network settings may include, for example, an IP address setting of the interactive whiteboard 2, a netmask setting, a default gateway setting, and/or a DNS (Domain Name System) setting.

The setting file output unit 49b stores the setting information of the interactive whiteboard 2 in the USB memory 5 as a setting file. Note that the content of the setting file may not be viewed by the user for security reasons.

The setting file input unit 49a reads a setting file stored in the USB memory 5 and applies the setting information to the relevant settings of the interactive whiteboard 2.

The address book input unit 50 reads an IP address list file of connection destinations for participating in a remote sharing process from the USB memory 5 and manages the read IP address list file in the connection destination management table 440.

FIG. 13A is a table illustrating an exemplary data configuration of the connection destination management table 440. As illustrated in FIG. 13A, the connection destination management table 440 manages pre-acquired information relating to various connection destinations. The connection destination management table 440 is used when the interactive whiteboard 2 acts as a participating apparatus that is attempting to participate in (join) a remote sharing process. By using the connection destination management table 440, the user of the participating apparatus may be relieved of the trouble of having to manually enter the IP address of the interactive whiteboard acting as the host apparatus of the remote sharing process. The destination management table 440 manages a location name of a location of the interactive whiteboard 2 that may act as a host apparatus of a remote sharing process that the participating apparatus may be able to join, the IP address of this interactive whiteboard 2, and the connection status of this interactive whiteboard 2. Note that the connection status is an exemplary embodiment of communication status information of the present invention. Also, the connection destination table 440 is an exemplary embodiment of a status storage unit of the present invention.

FIG. 13B is a table illustrating exemplary connection statuses of a connection destination. The connection status of a connection destination may be, for example, one of five possible connection statuses including "offline", "online", "in session", "in session (compatible)", and "in session (different version)". The connection status may be determined based on a combination of whether communication can be established between the host apparatus and the participating apparatus ("communication"), whether a conference is in session ("session status"), and whether participation is possible ("participation"). For example, if communication is "impossible", the session status is "unknown" and the ability to participate is "unknown", and accordingly, the connection status is determined to be "offline". "Online" corresponds to a connection status in a case where communication is "possible" but a session is "not in session" so that the ability to participate is "unknown". If communication is "possible", a session is "in session", and participation is "participation possible", the connection status is determined to be "in session". Note that "in session" refers to a connection status where the user of the host apparatus can perform predetermined operations on page data and share the page data with the participating apparatus, for example.

"In session (compatible)" refers to a connection status where the host apparatus and the participating apparatus are using different software versions but participation is possible in compatible mode. Note that in compatible mode, only functions of the older version of the software may be implemented.

"In session (different version)" refers to a connection status where the host apparatus and the participating apparatus are using different software versions thereby making participation impossible. This may occur when there are wide variations between the different software versions, for example.

Note that in this case, the user of the participating apparatus has to manually input the IP address of the host apparatus by operating an input device such as a touch panel to start (participate in) a remote sharing process with the host apparatus. The user of the participating apparatus may acquire the IP address of the host apparatus from the user of the host apparatus via telephone or email, for example.

The participating location management table 450 is a table used when the interactive whiteboard 2 acts as a host apparatus. The participating location management table 450 manages information related to one or more interactive whiteboards currently participating in a remote sharing process hosted by the interactive whiteboard 2 as participating apparatuses. As illustrated in FIG. 14, for example, the participating location management table 450 stores a location name of a location of the interactive whiteboard 2 currently participating in the remote sharing process, an IP address of this interactive whiteboard 2, and a location color for this interactive whiteboard 2 in association with each other. Note that in a case where there is a plurality of participating apparatuses, a plurality of IP addresses are registered in the participating location management table 450.

The location color may be determined based on the chronological order of participation in the remote sharing process. For example, the color magenta may be assigned a starting location (first location) where the remote sharing process is started, cyan may be assigned to a second location, orange may be assigned to a third location, and green may be assigned to a fourth location. Note that in a case where the second location leaves (exits) the remote sharing process, for example, the chronological order of the locations after the second location is moved up such that cyan is assigned to the third location, and orange is assigned to the fourth location.

Note that when a participating apparatus joins or exits the remote sharing process, a remote connection process unit 81 of the server 90 transmits a participating location management table to the client 20 via a remote connection result transmitting unit 72. In turn, a remote start process unit 61 or a remote participation process unit 62 of the client 20 receives the participating location management table. The participating location management table may include information on one or more locations having IP addresses matching the IP addresses of locations registered in the connection destination management table 440 of the client 20. If a location name of a location included in the received participating location management table is not set up in the connection destination management table 440, the location name associated with the corresponding IP address of the location included in the participating location management table may be registered in the connection destination management table 440.

(Functional Configuration of Communication Control Unit)

In the following, a functional configuration of the communication control unit 60 is described with reference to FIG. 5. FIG. 5 is a block diagram illustrating an exemplary functional configuration of the communication control unit 60. The communication control unit 60 controls communications with another interactive whiteboard 2 via the communication network 9 and communications with the communication control unit 70 of the server 90 (described below), for example. The communication control unit 60 includes the remote start process unit 61, the remote participation process unit 62, a remote image transmitting unit 63, a remote image receiving unit 64, a remote operation transmitting unit 65, a remote operation receiving unit 66, a remote context transmitting unit 68, a remote context receiving unit 67, and a participating location management table 610.

The remote start process unit 61 sends a request to start a new remote sharing process to the server 90 within the same interactive whiteboard 2, and receives a result of the request from the server 90. In this case, the remote start process unit 61 refers to the remote license management table 310 to determine whether license information (e.g. product ID, license ID, and expiry) for a remote sharing process is managed in the remote license management table 310. If the license information is managed in the remote license management table 310, the remote start process unit 61 may make a request to start a remote sharing process. However, if the license information is not managed in the remote license management table 310, a request to start a remote sharing process cannot be made.

The participating location management table 610 is used when the interactive whiteboard 2 acts as a host apparatus of a remote sharing process. The participating location management table 610 manages information relating to one or more other interactive whiteboards 2 currently participating in the remote sharing process as participating apparatuses. As illustrated in FIG. 14, the participating location management table 610 stores and manages a location name of an interactive whiteboard 2 participating in the remote sharing process and an IP address of this interactive whiteboard 2 in association with each other.

The remote participation process unit 62 transmits a participation request for participating in a remote sharing process to a remote connection request receiving unit 71 of the server 90 of the interactive whiteboard 2 acting as the host apparatus of the remote sharing process via the communication network 9. In this case, the remote participation process unit 62 refers to the remote license management table 310. Also, in the case where the remote participation process unit 62 is to make a request to participate in a remote sharing process that has already been started, the remote participation process unit 62 may refer to the connection destination management table 440, and acquire the IP address of the interactive whiteboard 2 to which the participation request is to be sent (participation destination). Note, however, that in some embodiments, the connection destination management table 440 may not be referenced by the remote participation process unit 62, and the IP address of the interactive whiteboard 2 corresponding to the participation destination may be input by the user operating an input unit such as a touch panel, for example.

The remote image transmitting unit 63 receives the output image (C) from the video acquisition unit 21 via the image acquisition unit 31, and transmits the received output image (C) to the server 90.

The remote image receiving unit 64 receives image data from a video output device connected to another interactive whiteboard 2 via the server 90 and outputs the received image data to the display overlay unit 36 to enable a remote sharing process.

The remote operation transmitting unit 65 transmits to the server 90 various operation data used for a remote sharing process. The operation data may include, for example, data relating to operations such as adding a stroke, deleting a stroke, editing a stroke (e.g. zoom in, zoom out, move), storing page data, creating page data, duplicating page data, deleting page data, and switching a page being displayed, for example. The remote control receiving unit 66 receives operation data input at another interactive whiteboard 2 from the server 90, and outputs the received operation data to the image processing unit 30 to perform a remote sharing process.

The remote context transmitting unit 68 acquires information on a marker event, a gesture event, a page creation/deletion event, and/or a file reading event from the context process unit 39, and transmits the acquired event information to the server 90 as a remote context.

The remote context receiving unit 67 acquires event information generated at another interactive whiteboard 2 from the server 90, and outputs the acquired event information to the image processing unit 30 so that the context process unit 39 can display a corresponding location image.

[Functional Configuration of Server]

In the following, a functional configuration of the server 90 is described with reference to FIG. 5. The server 90 is included in each interactive whiteboard 2 such that each interactive whiteboard 2 may be capable of acting as a server (host) apparatus. As illustrated in FIG. 5, the server 90 includes a communication control unit 70 and a data management unit 80.

(Functional Configuration of Communication Control Unit)

In the following, a functional configuration of the communication control unit 70 is described with reference to FIG. 5.

The communication control unit 70 controls communications with the communication control unit 60 of the client 20 within the same interactive whiteboard 2 as well as communications with the communication control unit 70 of another interactive whiteboard 2 via the communication network 9. The data management unit 80 manages various data such as operation data and image data, for example.

The communication control unit 70 includes the remote connection request receiving unit 71, a remote connection result transmitting unit 72, a remote image receiving unit 73, a remote image transmitting unit 74, a remote operation receiving unit 75, a remote operation transmitting unit 76, a remote context receiving unit 78, and a remote context transmitting unit 77.

The remote connection request receiving unit 71 receives a start request for starting a remote sharing process from the remote start process unit 61, and receives a participation request for participating in a remote sharing process from the remote participation process unit 62. The remote connection result transmitting unit 72 transmits the result of the start request for starting the remote sharing process to the remote start process unit 61, and transmits the result of the participation request for participating in the remote sharing process to the remote participation process unit 62.

The remote image receiving unit 73 receives image data (e.g. data of output image data (C)) from the remote image transmitting unit 63 and transmits the received image data to a remote image processing unit 82, which is described below. The remote image transmitting unit 74 receives image data from the remote image processing unit 82 and transmits the received image data to the remote image receiving unit 64.

The remote operation receiving unit 75 receives operation data from the remote operation transmitting unit 65 (e.g. data of stroke image (B)) and transmits the received operation data to a remote operation process unit 83, which is described below. The remote operation transmitting unit 76 receives operation data from the remote operation process unit 83 and transmits the received operation data to the remote operation receiving unit 66.

The remote context receiving unit 78 receives a remote context from the client 20 and outputs the received remote context to the remote operation process unit 83. The remote operation process unit 83 adds identification information of its location (e.g. IP address) to the received remote context and outputs the remote context to the remote context transmitting unit 77. The remote context transmitting unit 77 transmits the identification information of its location and the remote context to the client 20.

(Functional Configuration of Data Management Unit)

In the following, a functional configuration of the data management unit 80 is described with reference to FIG. 5. The data management unit 80 includes a remote connection process unit 81, a remote image processing unit 82, a remote operation process unit 83, an operation synthesis process unit 84, and a page process unit 85. Note that the server 90 further includes a passcode management unit 810, a participating location management table 820, an image data management unit 830, an operation data storage unit 840, and a page data storage unit 850.

The remote connection process unit 81 starts a remote sharing process and terminates the remote sharing process. The remote connection process unit 81 also checks whether a license is secure and whether the license is still valid based on license information received by the remote connection request receiving unit 71 from the remote start process unit 61 together with a start request for starting a remote sharing process, or license information received by the remote connection request receiving unit 71 from the remote participation process unit 62 together with a participation request for participating in a remote sharing process. Further, the remote connection process unit 81 checks whether the number of participation requests received from other interactive whiteboards 2 acting as client (participating) apparatuses has not exceeded a predetermined number of participating apparatuses that are allowed to participate in the remote sharing process.

Further, the remote connection process unit 81 determines whether a passcode received along with a participation request for participating in a remote sharing process from another interactive whiteboard 2 is the same as a passcode managed in the passcode management unit 810. If the passcodes are determined to be the same, the remote connection process unit 81 allows the requesting interactive whiteboard 2 to participate in the remote sharing process. Note that the passcode is issued by the remote connection process unit 81 upon starting a new remote sharing process, and the passcode may be communicated from the user of the interactive whiteboard 2 acting as the host apparatus to a user of another interactive whiteboard 2 that is to participate in the remote sharing process as a participating apparatus via telephone or email, for example. Thus, the user of the other interactive whiteboard 2 that is to participate in the remote sharing process as a participating apparatus may input the passcode to this other interactive whiteboard 2 and transmit a participation request. In this way, the other interactive whiteboard 2 may be allowed to participate in the remote sharing process. Note that in some embodiments, the confirmation of the passcode may be omitted in the interest of improving user convenience over security, and participation in a remote sharing process may allowed merely through confirmation of the license of the other interactive whiteboard 2, for example.

Also, the remote connection process unit 81 stores in the participating location management table 820 of the server 90 participating location information included in the participation request transmitted via the communication network 9 from the remote participation process unit 62 of the other interactive whiteboard 2 that is to act as a participating apparatus. The remote connection processing unit 81 then reads the remote location information stored in the participating location management table 820 and transmits the remote location information to the remote connection result transmitting unit 72. The remote connection result transmitting unit 72 transmits the remote location information to the remote start process unit 61 of the client 20 of the same interactive whiteboard 2 acting as the host apparatus. The remote start process unit 61 stores the remote location information in the participating location management table 610. In this way, the remote location information may be managed at both the client 20 and the server 90 of the interactive whiteboard 2 that is acting as a host apparatus.

The remote image processing unit 82 receives image data (output image (C)) from the video output device (e.g. notebook PC 6) connected to the client 20 of each interactive whiteboard 2 participating in the remote sharing process (including the client 20 of the same interactive whiteboard 2 corresponding to the host apparatus) and stores the received image data in the image data storage unit 830. Also, the remote image processing unit 82 determines the display order of the image data to be shared in the remote sharing process based on the order in which the image data are received at the server 90 of the interactive whiteboard 2 corresponding to the host apparatus. Also, the remote image processing unit 82 refers to the participating location management table 820, and transmits the image data according to the display order as determined above to the client 20 of each of the interactive whiteboards 2 participating in the remote sharing process (including the client 20 of the same interactive whiteboard 2 corresponding to the host apparatus) via the communication control unit 70 (remote image transmitting unit 74).

The remote operation process unit 83 receives various operation data (e.g. stroke image (B)) relating to a stroke image drawn at the client 20 of each interactive whiteboard 2 participating in the remote sharing process (including the client 20 of the same interactive whiteboard 2 corresponding to the host apparatus), and determines the display order of the image to be shared in the remote sharing process based on the order in which the operation data is received at the server 90 of the interactive whiteboard 2 corresponding to the host apparatus. Note that the operation data may be the same as the operation data described above. Also, the remote operation process unit 83 refers to the participating location management table 820 and transmits the operation data to the client 20 of each of the interactive whiteboards 2 participating in the remote sharing process (including the client 20 of the same interactive whiteboard 2 corresponding to the host apparatus).

The operation synthesis process unit 84 synthesizes the operation data of each interactive whiteboard 2 output from the remote operation process unit 83, stores the operation data resulting from the synthesis process in the operation data storage unit 840, and returns the operation data to the remote operation process unit 83. The operation data is then transmitted to the client 20 of the interactive whiteboard 2 corresponding to the host apparatus and the client 20 of each of the interactive whiteboards 2 corresponding to participating apparatuses. In this way, the same image relating to the operation data may be displayed at each of the interactive whiteboards 2. FIG. 15 is a table illustrating an exemplary data configuration of the operation data. As illustrated in FIG. 15, the operation data has various items of data associated with each other including a sequence number (SEQ), the operation name of the operation data, the IP address of the interactive whiteboard 2 corresponding to the sender of the operation data and the port number of the client (or server), the IP address of the interactive whiteboard 2 corresponding to the destination of the operation data and the port number of the client (or server), the operation type of the operation data, the operation object of the operation data, and the data content of the operation data. For example, the operation data with the sequence number (SEQ) 1 indicates that a stroke has been drawn at the client 20 (Port No.: 50001) of the interactive whiteboard 2 corresponding to the host apparatus (IP address: 192.0.0.1) and the operation data relating to the stroke drawing has been sent to the server 90 (Port No.: 50000) of the same interactive whiteboard 2 corresponding to the host apparatus (IP address: 192.0.0.1). Further, in this operation data, "STROKE" is indicated as the operation type, the page data ID "p005" is indicated as the operation object, and data representing a stroke is included as the data content of the operation data. The operation data with the sequence number (SEQ) 2 indicates that the operation data relating to the stroke drawing has been sent from the server 90 (Port No.: 50000) of the interactive whiteboard 2 corresponding to the host apparatus (IP address: 192.0.0.1) to the client 20 (Port No.: 50001) of another interactive whiteboard 2 corresponding to a participating apparatus (IP address: 192.0.0.2).

Note that the operation synthesis process unit 84 synthesizes the operation data according to the order in which the operation data is input to the operation synthesis process unit 84. Accordingly, if the communication network 9 is not congested, a stroke image (B) may be displayed at the display 3 of each of the interactive whiteboards 2 participating in the remote sharing process according to the order in which the strokes are drawn by the users of the interactive whiteboards 2.

The page process unit 85 has the same function as that of the page process unit 37 of the image processing unit 30 of the client 20. That is, in the server 90, the page process unit 85 stores page data as illustrated in FIGS. 6-8 in the page data storage unit 850. Note that the page data storage unit 850 may have substantially the same configuration as that of the page data storage unit 300 of the image processing unit 30, and therefore, descriptions of the page data storage unit 850 are omitted.

<Process/Operation>

Figure 17:
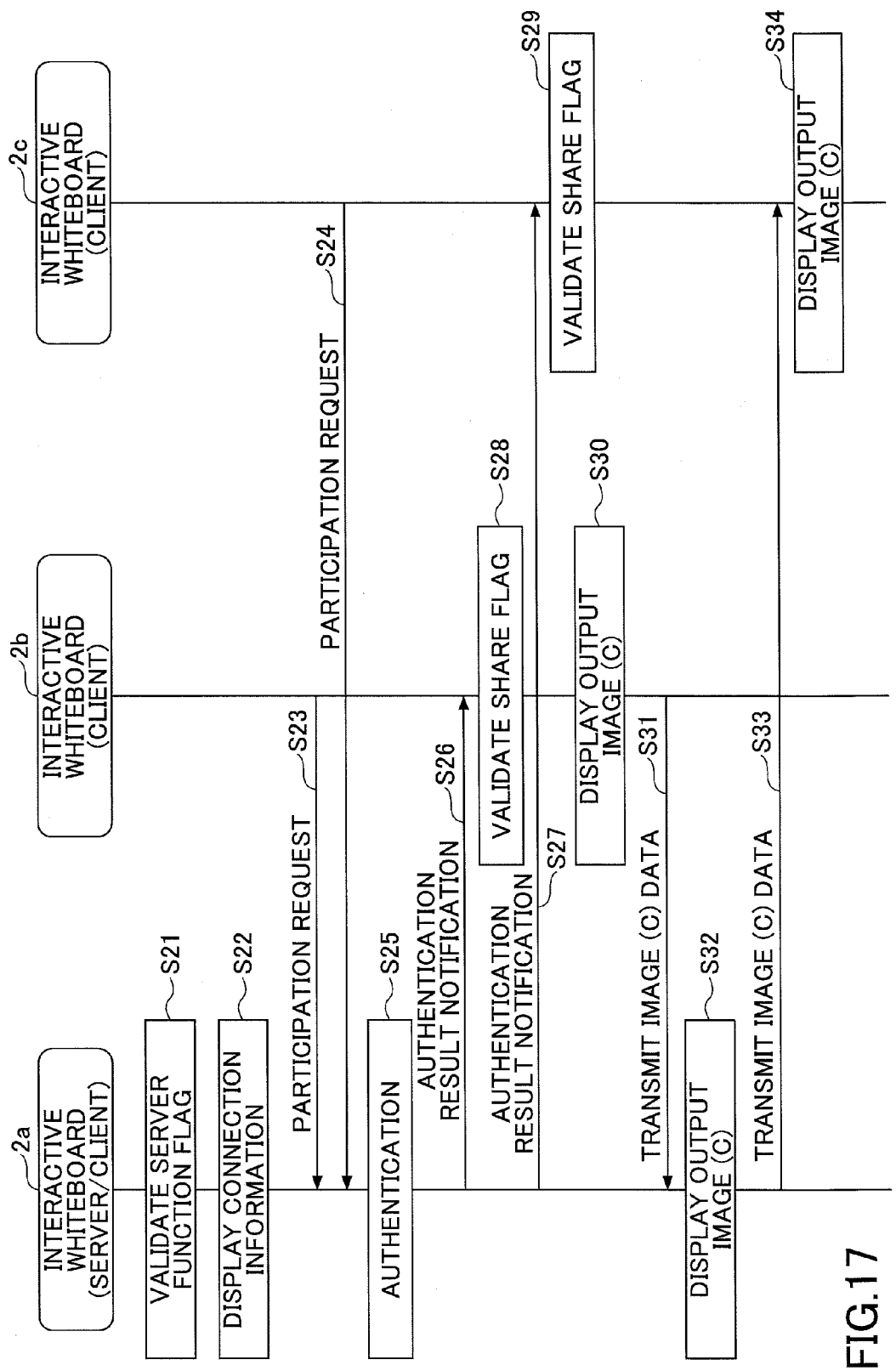
FIG. 17 is a sequence chart illustrating exemplary process steps for enabling an interactive whiteboard to participate in a remote conference.
Figure 18:
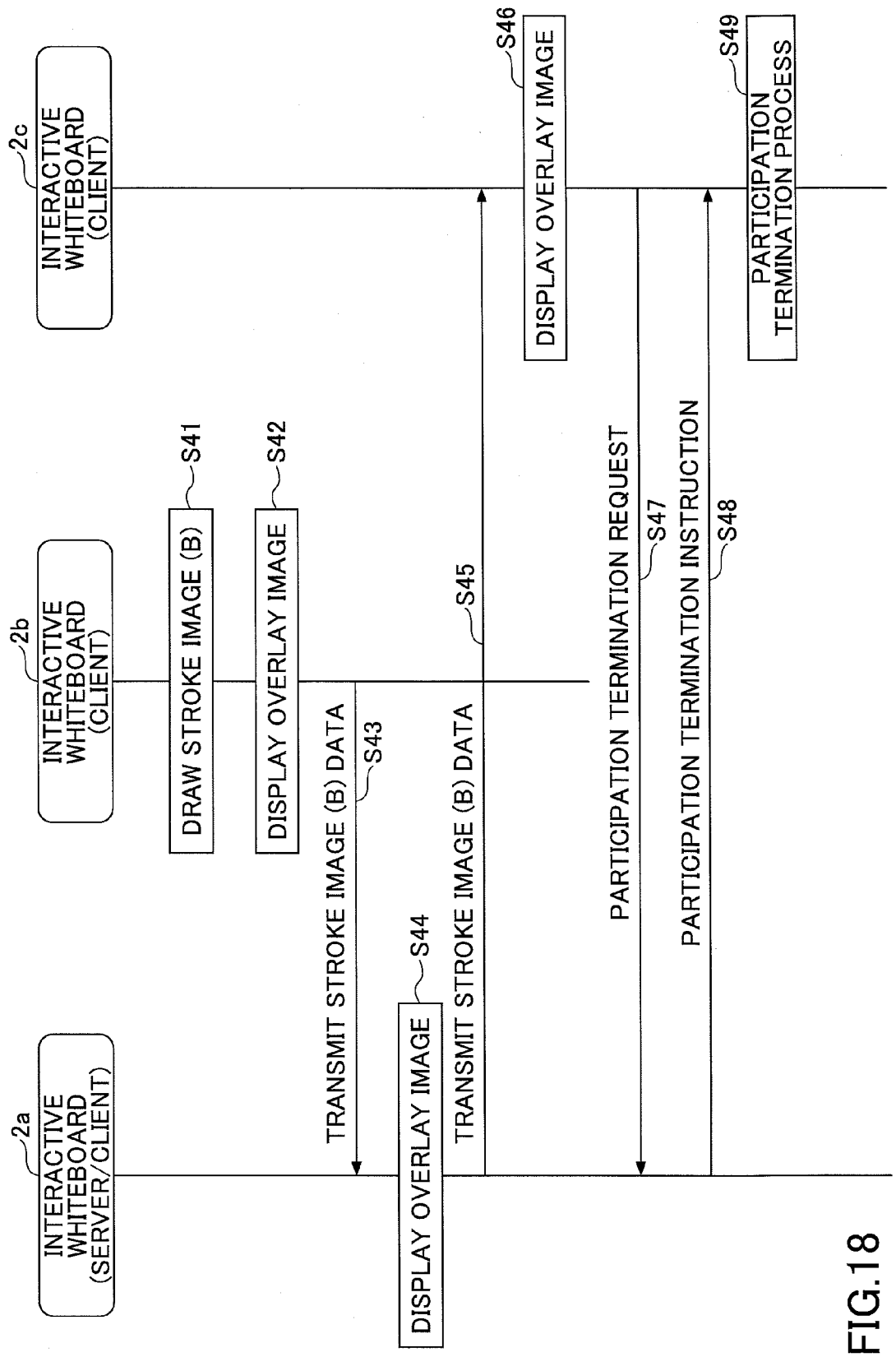
FIG. 18 is a sequence chart illustrating exemplary process steps for displaying images at interactive whiteboards.

In the following, processes and operations according to embodiments of the present invention are described with reference to FIGS. 17 and 18. FIGS. 17 and 18 are sequence charts illustrating exemplary processes of interactive whiteboards 2a-2c. Note that in FIGS. 17 and 18, it is assumed that the interactive whiteboard 2a is acting as a host apparatus (server and client) hosting a remote sharing process, and the interactive whiteboard 2b and 2c are acting as participating apparatuses (clients) participating in the remote sharing process. Also, note that displays 3a, 3b, and 3c and notebook PCs 6a, 6b, and 6c are connected to the interactive whiteboards 2a, 2b and 2c, respectively. Further, electronic pens 4a, 4b, and 4c are used at the interactive whiteboards 2a, 2b, and 2c, respectively.

First, a process for enabling the interactive whiteboards 2b and 2c to participate in the remote sharing process is described below.

When the user turns on the power of the interactive whiteboard 2a, the client 20 of the interactive whiteboard 2a is activated. Then, when the user performs an operation for activating the server 90 of the interactive whiteboard 2a by operating an input unit such as a touch panel, for example, the remote start process unit 61 of the client 20 of the interactive whiteboard 2a outputs an instruction to start a process of the server 90 to the remote connection request receiving unit 71 of the server 90 of the same interactive whiteboard 2a. In this way, various processes may be started at both the client 20 and the server 90 of the interactive whiteboard 2a (step S21).

Then, the UI image generation unit 33 of the client 20 of the interactive whiteboard 2a generates connection information for establishing connection with the interactive whiteboard 2a, and the video overlay unit 28 acquires the generated connection information from the UI image generation unit 33 via the display overlay unit 36 and displays the acquired connection information on the display 3a (step S22). The connection information includes the IP address of the host apparatus and a passcode generated for the present remote sharing process. In this case, the passcode stored in the passcode management unit 810 is retrieved (read) by the remote connection process unit 81 and is sequentially transmitted from the remote connection process unit 81 to the remote connection result transmitting unit 72 and the remote start process unit 61 as illustrated in FIG. 5. Further, the passcode is transmitted from the communication control unit 60 including the remote start process unit 61 to the image processing unit 30 as illustrated in FIG. 3 and is ultimately input to the UI image generation unit 33. In this way, the passcode may be included in the connection information. In turn, the user of the interactive whiteboard 2a may communicate the connection information to the users of the interactive whiteboards 2b and 2c via telephone or email, for example.

Note that if the participating apparatus (interactive whiteboards 2b and 2c) is provided with the connection destination management table 440, the IP address of the host apparatus does not necessarily have to be included in the connection information. That is, the participating apparatus may be able to make a participation request to participate in the remote sharing process without acquiring the IP address of the host apparatus. FIG. 19 illustrates an exemplary screen image that may be generated by the UI image generation unit 33 of the participating apparatus in this case for enabling participation in the remote sharing process.

Then, at each of the interactive whiteboards 2b and 2c, when the user inputs connection information by operating an input unit such as a touch panel, for example, the remote participation processing unit 62 of the client 20 of each of the interactive whiteboards 2b and 2c receives the connection information and makes a participation request by transmitting a passcode to the remote connection request receiving unit 71 of the server 90 of the interactive whiteboard 2a via the communication network 9 based on the IP address included in the connection information (steps S23, S24). In this way, the remote connection request receiving unit 71 of the communication control unit 70 receives the participation requests (including the passcodes) from the interactive whiteboards 2b and 2c and outputs the passcodes to the remote connection process unit 81.

Then, the remote connection process unit 81 authenticates the passcode received from the client 20 of each of the interactive whiteboards 2b and 2c using the passcode stored in the passcode management unit 810 (step S25). Then, the remote connection result transmitting unit 72 provides notification of the authentication result to the client 20 of each of the interactive whiteboards 2b and 2c (steps S26, S27). If the interactive whiteboards 2b and 2c are successfully authenticated in the authentication process of step S25, communication for the remote sharing process may be established between the interactive whiteboard 2a corresponding to the host apparatus and the interactive whiteboards 2b and 2c corresponding to the participating apparatuses, and the remote participation process unit 62 of the client 20 of each of the interactive whiteboards 2b and 2c enables participation in the remote sharing process with the other interactive whiteboards (steps S28 and S29).

(Output Image Display)

In the following, image data processing that is executed in the remote sharing process is described with reference to FIG. 17.

First, the interactive whiteboard 2b displays the output image (C) on the display 3b (step S30). Specifically, the image acquisition unit 31 of the interactive whiteboard 2b receives data of the output image (C) displayed at the notebook PC 6b from the notebook PC 6b via the video acquisition unit 21, and transmits the acquired image data to the display 3b via the display overlay unit 36 and the video overlay unit 28. In this way, the output image (C) may be displayed on the display 3b.

Then, the image processing unit 30 including the image acquisition unit 31 of the interactive whiteboard 2b transmits the data of the output image (C) to the remote image transmitting unit 63, and the communication control unit 60 including the remote image transmitting unit 63 transmits the data of the output image (C) to the communication control unit 70 of the interactive whiteboard 2a corresponding to the host apparatus via the communication network 9 (step S31). In this way, the remote image receiving unit 73 of the interactive whiteboard 2a may receive the data of the output image (C) and output the received image data to the remote image processing unit 82, and the remote image processing unit 82 may store the data of the output image (C) in the image data storage unit 830.

Then, the interactive whiteboard 2a corresponding to the host apparatus displays the output image (C) on the display 3a (step S32). Specifically, the remote image processing unit 82 of the interactive whiteboard 2a outputs the data of the output image (C) received from the remote image receiving unit 73 to the remote image transmitting unit 74. The remote image transmitting unit 74 outputs the data of the output image (C) to the remote image receiving unit 64 of the client 20 of the same interactive whiteboard 2a corresponding to the host apparatus. The remote image receiving unit 64 outputs the data of the output image (C) to the display overlay unit 36. The display overlay unit 36 outputs the data of the output image (C) to the image overlay unit 28. The image overlay unit 28 outputs the data of the output image (C) to the display 3a. In this way, the display 3a displays the output image (C).

Then, the communication control unit 70 including the remote image transmitting unit 74 of the server 90 of the interactive whiteboard 2a corresponding to the host apparatus transmits via the communication network 9 the data of the output image (C) to the communication control unit 60 of the other interactive whiteboard 2c other than the interactive whiteboard 2b corresponding to the sender of the data of the output image (C) (step S33). In this way, the remote image receiving unit 64 of the interactive whiteboard 2c corresponding to the participating apparatus receives the data of the output image (C).

Then, the interactive whiteboard 2c displays the output image (C) on the display 3c (step S34). Specifically, the remote image receiving unit 64 of the interactive whiteboard 2c outputs the data of the output image (C) received in step S33 to the display overlay unit 36 of the interactive whiteboard 2c. The display overlay unit 36 outputs the data of the output image (C) to the image overlay unit 28. The image overlay unit 28 outputs the data of the output image (C) to the display 3c. In this way, the display 3c displays the output image (C).

Note that in a case where data of the UI image (A) and the stroke image (B) are input to the display overlay unit 36 in addition to the data of the output image (C), the display overlay unit 36 generates an overlay image (A, B, C), and the video overlay unit 28 outputs the overlay image (A, B, C) to the display 3c. Further, in a case where the video overlay unit 28 receives data of a teleconference video (E) from the teleconference terminal 7, the video overlay unit 28 generates a picture-in-picture overlay image by overlaying the data of the teleconference video (E) on the overlay image (A, B, C) and outputs the generated picture-in-picture overlay image to the display 3c.

(Overlay Image Display)

In the following, a process of displaying an overlay image in the remote sharing process is described with reference to FIG. 18.

First, the user draws a stroke image (B) on the interactive whiteboard 2b using the electronic pen 4b (step S41).

Then, as illustrated in FIG. 16, the display overlay unit 36 of the interactive whiteboard 2b overlays the stroke image (B) on the UI image (A), the output image (C), and the background image (D), and the video overlay unit 28 displays the resulting overlay image (A, B, C, D) on the display 3b of the interactive whiteboard 2b (step S42). Specifically, the stroke process unit 32 of the interactive whiteboard 2b receives the data of the stroke image (B) as operation data from the coordinates detection unit 21 and the contact detection unit 24 via the event sorting unit 25, and transmits the received data to the display overlay unit 36. In this way, the display overlay unit 36 can overlay the stroke image (B) on the UI image (A) and the output image (C), and the video overlay unit 28 can display the overlay image (A, B, C) on the display 3b of the interactive whiteboard 2b.

Then, the image processing unit 30 including the stroke process unit 32 of the interactive whiteboard 2b transmits the data of the stroke image (B) to the remote operation transmitting unit 65, and in turn, the remote operation transmitting unit 65 of the interactive whiteboard 2b transmits the data of the stroke image (B) to the communication control unit 70 of the interactive whiteboard 2a corresponding to the host apparatus via the communication network 9 (step S43). In turn, the remote operation receiving unit 75 of the interactive whiteboard 2a receives the data of the stroke image (B) and outputs the received image data to the remote operation process unit 83, and the remote operation process unit 83 outputs the data of the stroke image (B) to the operation synthesis process unit 84. In this way, each time a stroke is drawn on the interactive whiteboard 2b, the data of the stroke image (B) drawn on the interactive whiteboard 2b is transmitted in sequential order to the remote operation process unit 83 of the interactive whiteboard 2a corresponding to the host apparatus. Note that the data of the stroke image (B) transmitted each time a stroke is drawn corresponds to data represented by each stroke data ID as illustrated in FIG. 7. For example, when the user draws a letter of the alphabet "T" using the electronic pen 4b, two strokes are drawn on the interactive whiteboard 2b, and therefore, two sets of data representing stroke images (B) that are each identified by a stroke data ID are sequentially transmitted to the interactive whiteboard 2a.

Then, the interactive whiteboard 2a corresponding to the host apparatus displays the overlay image (A, B, C) including the data of the stroke image (B) transmitted from the interactive whiteboard 2b on the display 3a (step S44). Specifically, the operation synthesis process unit 84 of the interactive whiteboard 2a synthesizes the multiple sets of data of the stroke images (B) sequentially transmitted thereto via the remote operation process unit 83, stores the resulting synthesized data of the stroke images (B) in the operation data storage unit 840, and returns the synthesized data of the stroke images (B) to the remote operation process unit 83. In turn, the remote operation process unit 83 outputs the synthesized data of the stroke images (B) received from the operation synthesis process unit 84 to the remote operation transmitting unit 76. The remote operation transmitting unit 76 outputs the synthesized data of the stroke images (B) to the remote operation receiving unit 66 of the client 20 of the same interactive whiteboard 2a corresponding to the host apparatus. The remote operation receiving unit 66 outputs the synthesized data of the stroke images (B) to the display overlay unit 36 of the image processing unit 30. In turn, the display overlay unit 36 overlays the synthesized data of the stroke images (B) on the UI image (A) and the output image (C). Then, the video overlay unit 28 displays the overlay image (A, B, C) generated by the display overlay unit 36 on the display 3a.

Then, the communication control unit 70 including the remote operation transmitting unit 76 of the server 90 of the interactive whiteboard 2a corresponding to the host apparatus transmits via the communication network 9 the synthesized data of the stroke images (B) to the communication control unit 60 of the other interactive whiteboard 2c other than the interactive whiteboard 2b corresponding to the sender of the data of the stroke images (B) (step S45). In this way, the remote operation receiving unit 66 of the interactive whiteboard 2c corresponding to a participating apparatus receives the synthesized data of the stroke images (B).

Then, the interactive whiteboard 2c displays the overlay image (A, B, C) on the display 3c (step S46). Specifically, the remote operation receiving unit 66 of the interactive whiteboard 2c outputs the synthesized data of the stroke images (B) received in step S45 to the image processing unit 30 of the interactive whiteboard 2c. The display overlay unit 36 of the image processing unit 30 overlays the synthesized data of the stroke images (B) on the data of the UI image (A) and the outputs the data of the resulting overlay image (A, B, C) to the video overlay unit 28. In this way, the display 3c displays the overlay image (A, B, C).

Note that in the above process, an overlay image including the output image (C) is displayed on the display 3, but in other embodiments, the background image (D) may be displayed instead of the output image (C), for example. Further, in some embodiments, instead of displaying either the output image (C) or the background image (D), both the output image (C) and the background image (D) may be displayed on the display 3 at the same time, for example.

(Participation Termination)

In the following, referring to FIG. 18, a process is described for enabling a participating apparatus to terminate participation in the remote sharing process. Note that FIG. 18 illustrates an exemplary case where the interactive whiteboard 2c terminates participation in the remote sharing process.

First, when the interactive whiteboard 2c receives a participation termination request for terminating participation in the remote sharing process through a user operation of an input device such as a touch panel, for example, the remote participation process unit 62 of the interactive whiteboard 2c transmits the participation termination request to the remote connection request receiving unit 71 of the server 90 of the interactive whiteboard 2a corresponding to the host apparatus (step S47). In this way, the remote connection request receiving unit 71 of the communication control unit 70 of the interactive whiteboard 2a receives the participation termination request from the interactive whiteboard 2c, and outputs the participation termination request to the remote connection process unit 81 along with the IP address of the interactive whiteboard 2c. Then, based on the IP address of the interactive whiteboard 2c transmitted from the remote connection request receiving unit 71, the remote connection process unit 81 of the interactive whiteboard 2a deletes from the participating location management table 820 the IP address of the interactive whiteboard 2c making the participation termination request and the location name of the location of the interactive whiteboard 2a. Then, remote connection process unit 81 outputs a notification of the deletion of the IP address and the location name of the interactive whiteboard 2c to the remote connection result transmitting unit 72 of the interactive whiteboard 2a.

Then, the communication control unit 70 including the remote connection result transmitting unit 72 transmits via the communication network 9 a participation termination instruction to terminate participation to the communication control unit 60 of the client 20 of the interactive whiteboard 2c (step S48). In turn, the remote participation process unit 62 of the communication control unit 60 of the interactive whiteboard 2c disconnects the communication of the remote sharing process and performs a termination process for terminating the participation, and in this way, participation in the remote sharing process may be terminated (step S49).

(Screen for Participation)

FIG. 19 illustrates an exemplary screen showing a list of locations that may be displayed on the display 3 of a participating apparatus (interactive whiteboards 2b and 2c). In the present example, it is assumed that each participating apparatus includes the connection destination management table 440. In the following, display contents that are referenced by numbers in parentheses in FIG. 19 are described. The UI image generation unit 33 of the participating apparatus may display the screen as illustrated in FIG. 19 in response to a user operation, for example.

(1) Description of Screen

The following text is displayed as a description of the screen. "To participate in remote whiteboard, please select whiteboard location name and press [Join] button."

(2) Contact List or Manual Entry

The user may make a selection from a contact list or manually enter an IP address.

(3) Selection from Contact List

Each record of the contact list includes the items "whiteboard location name", "IP address or host name", and "group name". Also, the labels "whiteboard location name", "IP address or host name" and "group name" are indicated at the top of the contact list. Further an icon and an abbreviation of the whiteboard location name are displayed at the head of a record. Note that these features are described in detail below.

The "group name" is used to sort whiteboard locations into different groups such as "group01" and "group02". The group name of a whiteboard location may be determined based on the first letter of the whiteboard location name or its IP address, for example.

The user selects a whiteboard location name (host apparatus) to which a participation request is to be made by pressing a record of the contact list. Upon selecting the whiteboard location name, the IP address of the selected whiteboard location may be indicated at an IP address box (6) at the bottom portion of the screen. Note that the selection may be cancelled when the selected record is selected (pressed) once again, for example.

Note that when an icon is not displayed at the head of a record, or an "online" icon or an "in session" icon is displayed in gray (low brightness), this means that the corresponding record cannot be selected. Note that the icon legends (15) are described below.

(4) Scroll Bar (5) Specify Group Name

The user may enter or select a group name to narrow the records listed in the contact list.

(6) IP Address

The IP address of the whiteboard location name selected from the contact list is displayed.

(7) Join

When the user wishes to participate in a conference, the user may press a "Join" button.

(8) Cancel

When the user wishes to close the screen without participating in any conference, the user may press a "Cancel" button.

(9) In Session Icon

The "in session" icon indicates that participation is possible with respect to a corresponding whiteboard location. Note that the "in session" icon may be displayed when the connection status of the corresponding whiteboard location is "in session" (see FIG. 13B).

(10) Online Icon

The "online" icon indicates that a corresponding whiteboard location is connected to the network and has a remote license. Note that the online icon may be displayed when the connection status of the corresponding whiteboard location is "online" (see FIG. 13B).

(11) In Session (Participation Impossible)

An "in session (participation impossible)" icon indicates that although a corresponding whiteboard location is holding a conference, participation in the conference is not possible because a different software version is used. In FIG. 19, the "in session (participation impossible)" icon is displayed in gray. Note that the "in session (participation impossible)" icon may be displayed when the connection status of the corresponding whiteboard location is "in session (different version)" (see FIG. 13B).

(12) In Session in Compatible Mode Icon

An "in session in compatible mode" icon indicates that a corresponding whiteboard location is holding a conference in a compatible mode. Note that the "in session in compatible mode" icon may be displayed when the connection status of the corresponding whiteboard location is "in session (compatible)" (see FIG. 13B).

(13) Record of Location that Cannot be Selected

A record of a location that cannot be selected is displayed against a gray (low brightness) background and an icon is not displayed at such a record. Note that an icon may not be displayed when the connection status of the corresponding location is "offline" (see FIG. 13B).

(14) Record of Selected Location

A record of a selected location may be displayed in a predetermined color (or at high brightness).

(15) Icon Legend

The label "online" is displayed next to the "online" icon and the label "in session" is displayed next to the "in session" icon, and the label "in session in compatible mode" is displayed next to the "in session in compatible mode" icon.

(16) Abbreviation Label of Whiteboard Location Name

Labels "CO", "HQ", and "OF" as abbreviations of the whiteboard location names are displayed next to the records of the corresponding locations.

[Remote Context Transmission]

A remote context refers to the type of a particular event that is detected. When an event is detected, a notification of the remote context is transmitted to one or more interactive whiteboards 2 at other locations before a result of the event is reflected in an image displayed on the display 3. As described above, the other locations may be notified of events such as a marker event, a gesture event, a page creation/deletion event, a file reading event, another location participation event, or another location exit event by receiving the remote context. Note that the remote context is an example of operation content notification information of the present invention.

Figure 20:
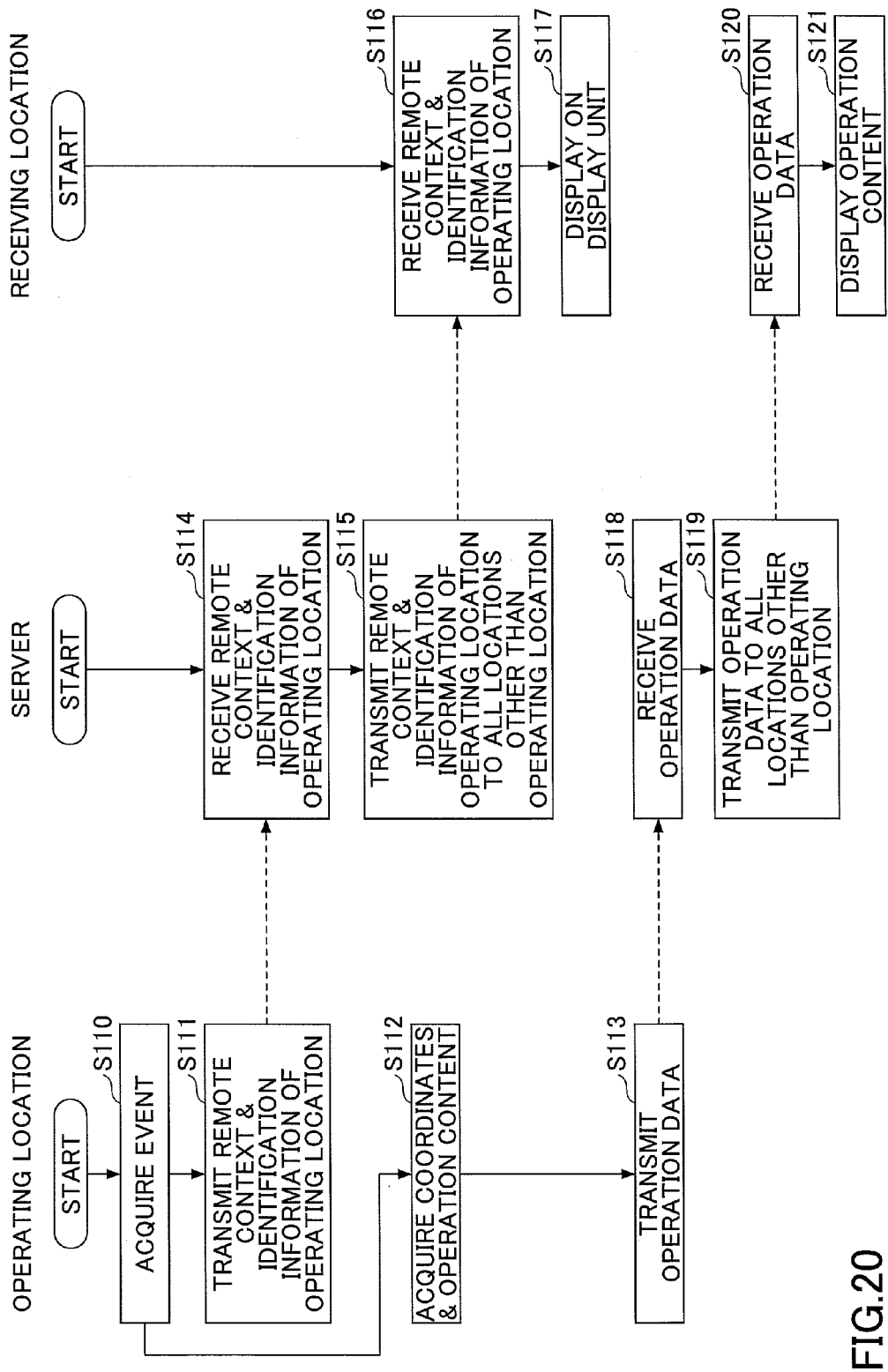
FIG. 20 is a flowchart illustrating exemplary process steps for transmitting a remote context.

FIG. 20 is a flowchart illustrating exemplary process steps of a remote context transmission process. Note that the process steps of FIG. 20 are performed at an operating location that acquires an event corresponding to the remote context, the server 90 that communicates with the client 20, and a receiving location that receives the remote context.

First, the interactive whiteboard 2 at the operating location acquires an event (step S110). Note that events that are to be processed as remote contexts are determined beforehand. Thus, the relevant events may be detected by the event sorting unit 25, the operation process unit 26, the gesture process unit 27, and the finger determination unit 29-1, for example.

The context process unit 39 determines a remote context name for the event, and transmits the remote context name along with identification information (e.g. IP address) of the operating location to the server 90 (step S111). Note that the remote context name may correspond to the remote context (event name), for example.

Then, the operating location acquires input coordinates and the operation content of the event (step S112). For example, if the event corresponds to a marker event, the coordinates of a finger may be acquired; and if the event corresponds to a gesture event, the type of gesture may be acquired. If the event corresponds to a page creation/deletion event or a file read event, a page number or a file name may be included in the acquired operation content, for example.

Then the remote operation transmitting unit 65 transmits operation data necessary for enabling a remote sharing process to the server 90 (step S113).

The remote context receiving unit 78 of the server 90 receives the remote context and the identification information of the operating location transmitted thereto in step S111 (S114).

The remote context transmitting unit 77 transmits the received remote context and the identification information of the operating location to all other locations registered in the participating location management table 820 other than the operating location (step S115).

The remote context receiving unit 67 at the receiving location receives the remote context and the identification information of the operating location (S116).

In turn, the context process unit 39 at the receiving location receiving the remote context displays the remote context (step S117). As described in detail below, the context process unit 39 refers to the participating management table 610 and acquires the location name and location color associated with the identification information of the operating location, and displays the remote context along with a corresponding operation icon. Note that the remote context may serve its purpose once the user is given prior notice of an operation, and as such, the remote context is preferably automatically deleted after being displayed for a predetermined time period to prevent affecting visibility and/or interfering with a stroke drawing operation, for example. Accordingly, the context process unit 39 may be configured to display the remote context for a predetermined time period of 3 seconds (example of first predetermined time period), for example, and thereafter, the context process unit 39 may arrange the remote context to fade out (gradually lose brightness and color to ultimately disappear) over a predetermined time period of 1 second (example of second predetermined time period), for example.

Meanwhile, the remote operation receiving unit 75 of the server 90 receives the operation data transmitted in step S113 (S118).

The remote operation transmitting unit 76 of the server 90 transmits the operation data to all other locations registered in the participating location management table 820 other than the operating location (S119).

The remote operation receiving unit 66 at the receiving location receives the operation data (S120).

The image processing unit 30 at the receiving location reflects the operation data on the display 3 (S121). For example, a marker or a stroke may be displayed, a displayed image may be enlarged/reduced according to a gesture operation, or a page may be created.

As described above, the receiving location receiving the remote context in step S117 may be notified of the operating location and the type of operation implemented by the operating location prior to receiving the operation data. In this way, the user at the receiving location may avoid drawing a stroke at the same location or performing other conflicting operations, for example.

Figure 21:
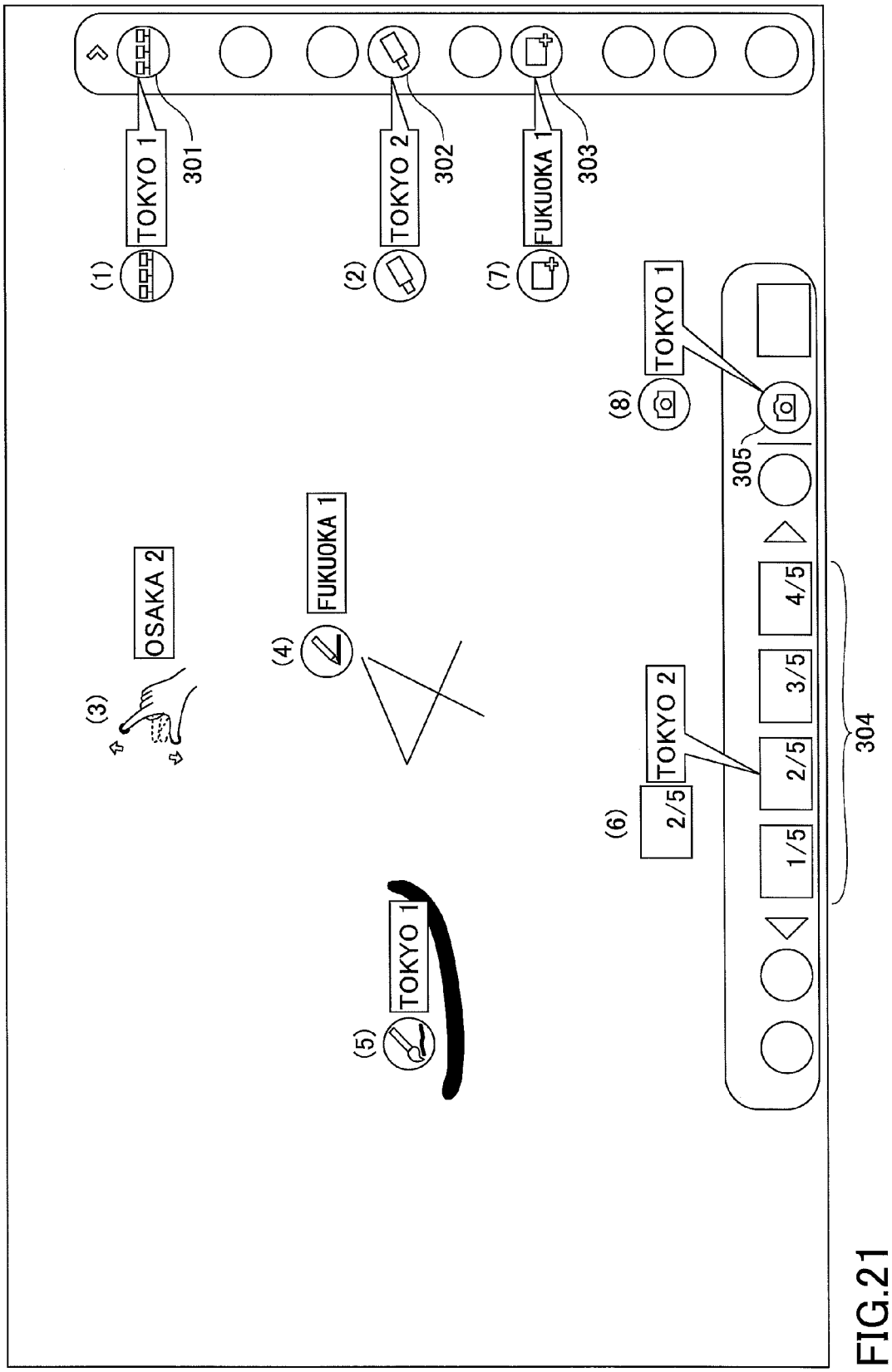
FIG. 21 illustrates exemplary remote contexts that may be displayed on a display of a location receiving the remote contexts.

FIG. 21 illustrates examples of remote contexts displayed on the display 3 at the receiving location. Note that for illustrative purposes, a total of eight remote contexts are shown in FIG. 21. However, in practice, it may be rare for eight remote contexts to be displayed at the same time.

In FIG. 21, an icon and a balloon are displayed with respect to one remote context. The icon to be displayed is determined beforehand according to the remote context (event content). Also, the location name of the operating location is indicated in the balloon. In the following, the remote contexts that are assigned reference numbers (1)-(8) in FIG. 21 are described in greater detail.

(1) Pressing Share Icon

A share icon 301 is pressed by a user in order to start a conference or participate in a conference. In FIG. 21, the share icon 301 is displayed at the upper right hand side of the display 3. When the user at the operating location presses the share icon 301, the context process unit 39 at the receiving location receives a corresponding remote context and displays the received remote context. Specifically, an icon identical to the share icon 301 and a balloon indicating the location name of the operating location are displayed in the vicinity of the share icon 301. Note that displaying the icon and the balloon "in the vicinity" of the share icon 301 may refer to displaying the icon and the balloon as close to the share icon 301 as possible without causing the above display items to overlap, for example.

(2) Pressing USB Memory Icon

A USB memory icon 302 may be pressed by a user in order to read a file from the USB memory 5. In FIG. 21, the USB memory icon 302 is displayed on the right side of the display 3. When the user at the operating location presses the USB memory icon 302, the context process unit 39 at the receiving location receives a corresponding remote context and displays the received remote context. Specifically, an icon identical to the USB memory icon 302 and a balloon indicating the location name of the operating location are displayed in the vicinity of the USB memory icon 302.

(3) Gesture Event Detection

When a gesture event is detected at the operating location, the context process unit 39 at the receiving location receives a corresponding remote context and displays the received remote context. Note that a gesture event may occur at any location, and as such, the context process unit 39 displays an icon indicating that a gesture event has been detected and a balloon indicating the location name of the operating location in the vicinity of the coordinates at which the gesture event has been detected. The gesture event may be any one of various gestures including, for example, enlarging an image as described below in connection with a third embodiment of the present invention. The icon indicating that a gesture event has been detected preferably depicts the corresponding gesture. In FIG. 21, an icon indicating that a gesture for enlarging an image has been detected is displayed.

(4) Pen Down Event Detection

When a pen down event is detected at the operating location, the context process unit 39 at the receiving location receives a corresponding remote context and displays the received remote context. Note that a pen down event may occur at any location, and as such, the context process unit 39 displays an icon indicating that a pen down event has been detected and a balloon indicating the location name of the operating location in the vicinity of the coordinates at which the pen down event (writing start point) has been detected. The vicinity of the coordinates at which the pen down event has been detected refers to a location near the starting point of a stroke. In FIG. 21, a pen down icon and a balloon indicating the location name of the operating location are displayed near a stroke image representing the number "4".

(5) Marker Event Detection

When a marker event is detected at the operating location, the context process unit 39 at the receiving location receives a corresponding remote context and displays the received remote context. Note that a marker event may occur at any location, and as such, the context process unit 39 displays an icon indicating that a marker event has been detected and a balloon indicating the location name of the operating location in the vicinity of the coordinates at which the marker event has been detected. In FIG. 21, a marker icon and a balloon indicating the location name of the operating location are displayed near the starting point of an arc-shaped marker.

The marker manipulated at Tokyo 1 may be a mark made by the user with a finger to emphasize and direct attention to a part of an image displayed on the interactive whiteboard 2 that is shared with other remote locations (e.g. Fukuoka 1, Osaka 2), for example. Users at the remote locations (e.g. Fukuoka 1, Osaka 2) may not know which part of the display 3 of the interactive whiteboard 2 is of interest at the moment, and the users at the remote locations may be focusing their attention on a part of the display 3 that is not particularly pertinent. In such case, the user at Tokyo 1 may use a marker to indicate to the users of the remote locations the part of the display 3 that is pertinent. In this way, smooth communication may be enabled between remote locations. Note that although a specific usage example of a marker is described above, features other than a marker may be used as well.

(6) Page Switching Event Detection

Thumbnails 304 of pages are displayed at a bottom portion of the display 3. The user can switch a page displayed on the display 3 by pressing one of the thumbnails 304. Such an operation is referred to as a page switching event. When a page switching event is detected at the operating location, the context process unit 39 at the receiving location receives a corresponding remote context and displays the received remote context. That is, the context process unit 39 displays an icon (with the same shape as the thumbnail) and a balloon indicating the location name of the operating location in the vicinity of the selected thumbnail 304.

(7) Pressing New Page Creation Icon

A new page creation icon 303 may be pressed by the user to create a new page. In FIG. 21, the new page creation icon 303 is displayed on the right side of the display 3. When the user presses the new page creation icon 303 at the operating location, the context process unit 39 at the receiving location receives a corresponding remote context and displays the received remote context. Specifically, an icon identical to the new page creation icon 303 and a balloon indicating the location name of the operating location are displayed in the vicinity of the new page creation icon 303.

(8) Pressing Capture Icon

A capture icon 305 may be pressed by a user to capture an image displayed on a page. In FIG. 21, the capture icon 305 is displayed at the bottom of the display 3. When the user presses the capture icon 305 at the operating location, the context process unit 39 at the receiving location receives a corresponding remote context and displays the received remote context. Specifically, the context process unit 39 displays an icon identical to the capture icon 305 and a balloon indicating the location name of the operating location in the vicinity of the capture icon 305.

Note that the above remote contexts (1)-(8) are merely illustrative examples, and any operation performed at the interactive whiteboard 2 may be represented as a remote context.

According to an aspect of the present embodiment, when a stroke or a marker is drawn by a user, for example, an icon or the like giving prior notice of the user operation may be displayed near a part of the display where the user operation is to be reflected. In this way, other users may refrain from drawing an object at the same spot so that drawings may be prevented from overlapping one another, for example. Also, a user may be given prior notice of an operation started by another user so that the user may avoid performing conflicting operations, for example.

Second Embodiment

As described above in connection with the first embodiment, the contact sensor 115 is capable of detecting the coordinates of a shielding object that comes into contact with the screen regardless of whether the shielding object corresponds to an electronic pen or some other pointer such as a finger. In the first embodiment, a drawing operation using the finger corresponds to a marker event, and a drawing operation using the electronic pen 4 corresponds to a stroke drawing event. By distinguishing operations depending on whether an electronic pen or a finger is used as described above, the operability of the image processing system 1 may be improved, for example.

To identify a shielding object as an electronic pen, a pen down event of the electronic pen may be detected, for example. However the mechanism for detecting a pen down event may not be used to determine when a shielding object corresponds to a finger. Accordingly, some form of finger determination process is required. Note that if such a finger determination process takes a long time, coordinates may not be drawn until the shielding object is identified as a finger, and the user may get an odd feeling from the lack of immediate response, for example.

Accordingly, in the image processing system 1 according to the second embodiment, a finger determination process that does not use the pen down event detection mechanism is performed in a manner such that a user is less likely to get an odd feeling. Note that in the following, descriptions of features of the second embodiment that may be substantially identical to the first embodiment are omitted, and features that differ from the first embodiment are described.

Figure 22A:
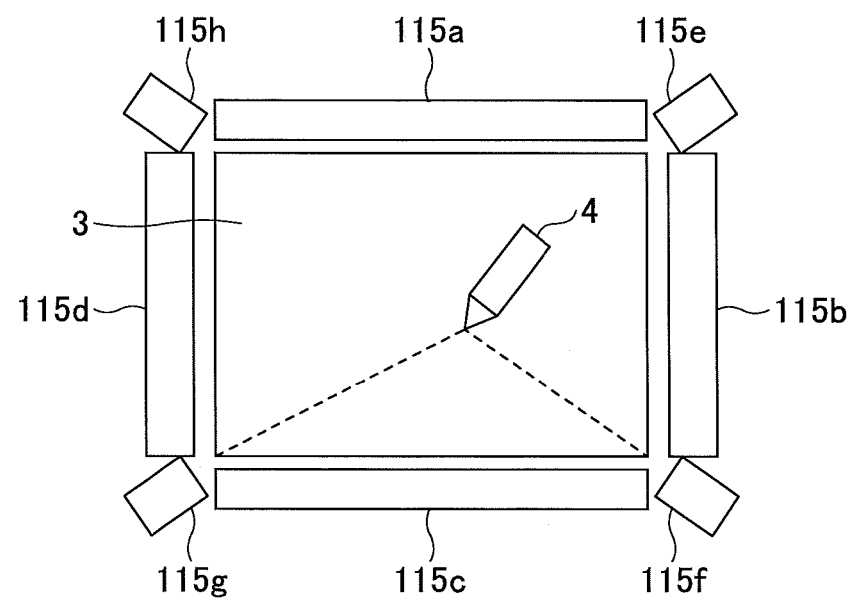
FIGS. 22A and 22B illustrate an exemplary configuration of a contact sensor.

FIG. 22A illustrates an overall configuration of the contact sensor 115 according to the present embodiment. In a case where the contact sensor 115 is an infrared sensor, images of the electronic pen 4 or a finger shielding light emitted by peripheral light emitting units 115a-115d are captured by two light receiving units 115f and 115g. The light receiving units 115f and 115g each have light receiving elements arranged one-dimensionally in the horizontal direction, and coordinates (position) of the electronic pen 4 or the finger are detected using the principles of triangulation based on which light receiving element in each of the light receiving units 115f and 115g has detected the shielding of light. Note that although four light receiving units 115e-115h are illustrated in FIG. 22A, the present embodiment merely requires at least two light receiving units. Also, the peripheral light emitting units 115a-115d may be retroreflectors, and in this case, the light receiving units 115e-115h may have light emitting functions.

Figure 22B:
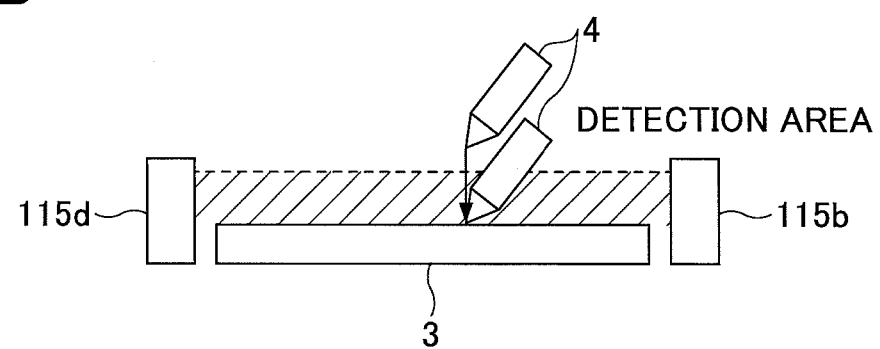

FIG. 22B is a side view of the contact sensor 115. The peripheral light emitting units 115a-115d form a detection area above the surface of the display 3. Accordingly, the light receiving units 115e-115h capture images of the electronic pen 4 before the electronic pen 4 comes into contact with the display 3 (corresponding to contact detection image event). Thereafter, when the electronic pen 4 comes into contact with the display 3, a pen down event is detected. Thus, a time delay occurs from the time the contact sensor 115 detects light shielding to the time the pen down event is detected. Note that the detection area is an example of a display face of the present invention.

On the other hand, in a case where the user touches the display with a finger, a pen down event would not be detected even after a certain time period elapses from the time light shielding is detected. In the present embodiment, this time period is used to detect a marker event. Further, in the present embodiment, coordinates are queued before the time period elapses so that coordinates of a marker may be drawn from the point the finger has started drawing the marker.

Figure 23:
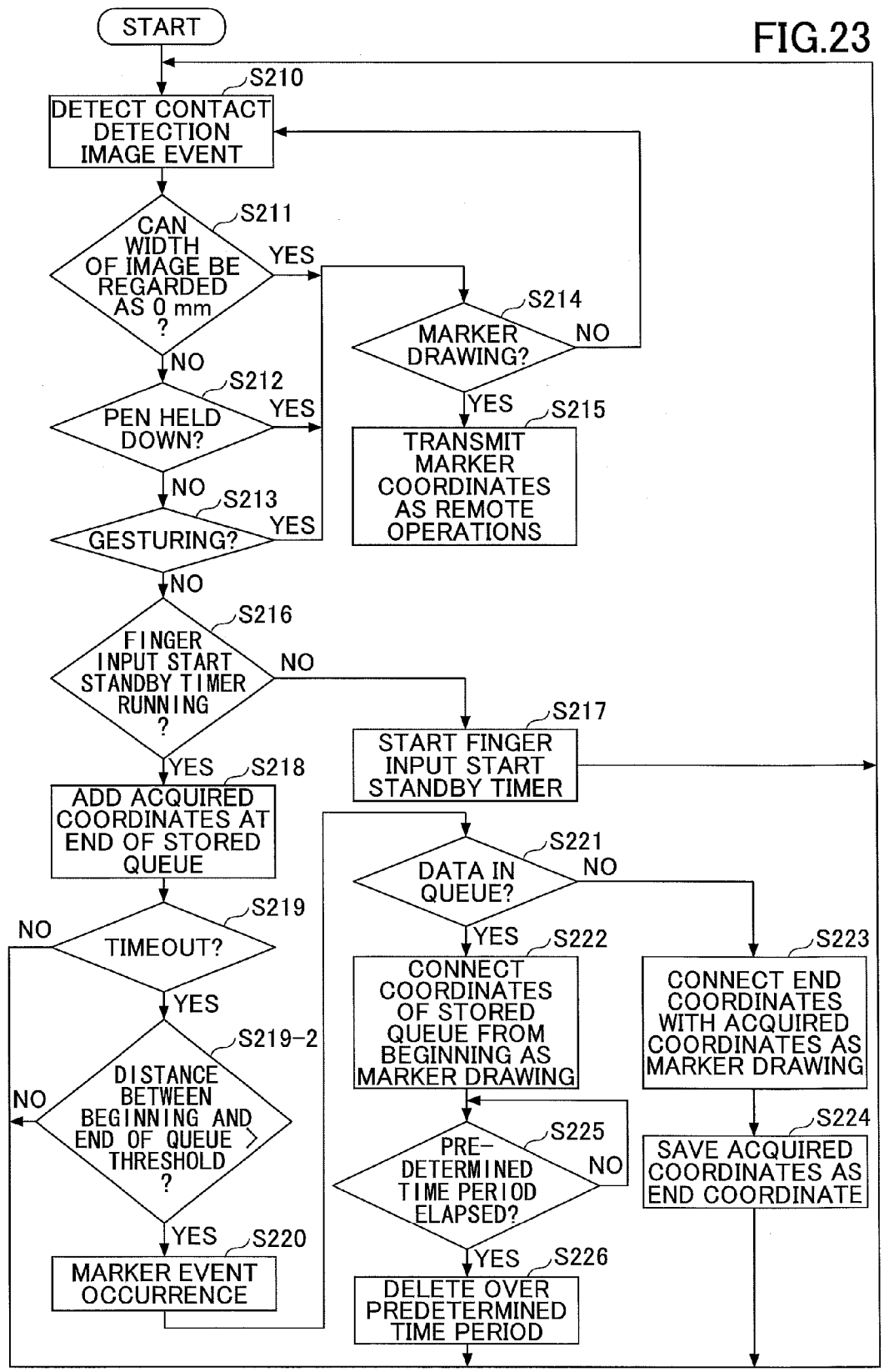
FIG. 23 is a flowchart illustrating exemplary process steps for determining that a finger is used to make a drawing and drawing a marker.

FIG. 23 is a flowchart illustrating exemplary process steps for the finger determination unit 29-1 to identify a drawing operation as that by a finger to draw a marker.

The event sorting unit 25 acquires a contact detection image event indicating that the coordinates detection unit 22 has detected coordinates, and notifies the finger determination unit 29-1 of the contact detection image event (S210).

The finger determination unit 29-1 makes an inquiry to the coordinates detection unit 22 regarding the width of the captured image to determine whether the image width is small enough to be regarded as zero (step S211). Note that the width of the captured image corresponds to the size of a light-shielded region. The image width may be determined based on the number of light receiving elements of the light receiving units 115e-115h that have ceased to detect light, for example. Note that when two light receiving units are used, the image width may be determined based on the average of the number of light receiving elements of the light receiving units that have detected light shielding, for example. By determining whether the image width may be regarded as zero, light shielding due to noise may be excluded upon detecting light shielding by a finger. Note that the value zero is an example of a lower limit threshold value of the present invention. Also, in a preferred embodiment, a determination may be made as to whether the image width is greater than a lower limit threshold value such as zero and less than an upper limit threshold value such as 30 cm, for example.

If the image width cannot be regarded as zero (step S211, NO), the finger determination unit 29-1 determines whether a pen down operation is taking place (S212). That is, a determination is made as to whether a pen down event is detected. If a pen down event is detected, it may be determined that the electronic pen 4 rather than a finger is touching the display 3. Note that the pen down event is an example of contact information of the present invention.

If a pen down event is not detected (step S212, NO), the finger determination unit 29-1 determines whether a gesture operation is taking place (S213). Examples of gesture operations include enlarging/reducing an image and turning a page. Note that "gesturing" refers to a case where a gesture operation is detected. While the gesture process unit 27 detects a gesture event, the finger determination unit 29-1 may determine that a gesture operation is taking place.

On the other hand, if the width of the capture image can be regarded as zero (step S211, YES), if a pen down operation is taking place (step S212, YES), or if a gesture operation is taking place (step S213, YES), the finger determination unit 29-1 determines whether a marker is being drawn (step S214). In this case, based on the determination results of steps S211-S213, it may be determined that the light is most likely being shielded by an object other than a finger. However, if a user has been drawing a marker immediately before the present contact detection image event, the marker process unit 38 may transmit coordinates drawn up to this point as marker coordinates to the server 90 (step S215). In this way, all marker coordinates may be shared.

Referring back to step S213, if a gesture operation is not taking place (step S213, NO), the finger determination unit 29-1 determines whether the finger input start standby timer 29-2 has been started (step S216).

If the finger input start standby timer 29-2 has not been started (step S216, NO), the finger determination unit 29-1 starts the finger input start standby timer 29-2 (step S217).

If the finger input start standby timer 29-2 has already been started (step S216, YES), the finger determination unit 29-1 adds acquired coordinates at the end of a queue (step S218).

Next, the finger determination unit 29-1 determines whether the finger input start standby timer 29-2 has timed out (S219). The time out period corresponds to a time period from the time a finger enters the detection area of the coordinates detection unit 22 to the time the finger touches the display 3, and may be set to several hundred milliseconds, for example. If the finger input start standby timer 29-2 has not yet timed out, the process is repeated from step S210.

If the finger input start standby timer 29-2 has timed out (step S219, YES), the finger determination unit 29-1 calculates the distance between the head of the queue and the end of the queue, and determines whether the moving distance of the finger is greater than a threshold value (e.g. 50 px [pixels]) (step S219-2). By determining the elapsed time as well as the moving distance, unnecessary markers resulting from small movements with little speed change due to wavering, for example, may be prevented from being displayed.

If the moving distance of the finger is greater than the threshold value (step S219-2, YES), the finger determination unit 29-1 determines that a drawing is being made by a finger and generates a marker event (step S220).

Next, the marker process unit 38 determines whether coordinates data is included in the queue (step S221).

If coordinates data is included in the queue (step S220, YES), the marker process unit 38 draws a marker by connecting the coordinates in the queue from the first coordinates into a line (S222). Then, the marker process unit 38 uses a timer to determine whether a predetermined time period has elapsed after the marker has been drawn (step S225). For example, the marker process unit 38 may determine whether a predetermined time period of 3 seconds has elapsed after the marker has been displayed. If the predetermined time period has not yet elapsed (step S225, NO), the marker process unit 38 continues measuring the time. If the predetermined time has elapsed (step S225, YES), the marker process unit 38 deletes the marker that has been displayed over a predetermined time period (step S226).

The line color of a marker drawn at an operating location may correspond to the location color of the operating location registered in the participating location management table 610, for example. In this way, the operating location at which the marker has been drawn may be distinguished at each of the participating locations. Also, to distinguish the marker line from a stroke drawn by the electronic pen 4, the marker line may be displayed wider than the stroke at a width of 20 px, for example. Further, the marker may be displayed at an opacity of about 40% so that the background image may be visible through the marker. After the marker is drawn, the marker may be automatically deleted to avoid interfering with other operations of the user. In this case, for example, after the marker is displayed for 3 seconds, a visual effect may be created in which the marker fades out over a period of 1 second.

Note that by varying the opacity of a marker from that of a stroke and deleting the marker over a predetermined time period after displaying the marker for a predetermined time period as described above, users at other locations may be prevented from confusing a stroke (drawing) by an electronic pen with a marker display generated by a finger or vice versa, for example. In a situation where a remote conference is held between multiple remote locations, for example, when a user at one location wishes to direct the attention of users at other locations to a certain section such as a figure displayed on the display 3, the user may point to the screen of the display 3 at his/her location and say, "Please look at this section," for example. In this case, the user may draw a circle or a line along the section of the display 3 to draw the attention of the other users to this section.

If there is no coordinate data in the queue (step S221, NO), the marker process unit 38 draws the marker by connecting end coordinates of the marker to the acquired coordinates by a line (step S223).

Then, the marker process unit 38 stores the acquired coordinates as the end coordinates of the marker (step S224).

According to an aspect of the present embodiment, by having each location transmit a drawing by a finger as a marker when a finger is used rather than the electronic pen 4, a drawing may be displayed in a different mode from that when the electronic pen 4 is used through simple operations. For example, by arranging a marker line to be displayed wider than a stroke, the marker may be suitably used to indicate a topic to be highlighted or emphasized. Also, because drawing a marker involves the use of a finger rather than the electronic pen 4, the operation may feel more natural and intuitive to the user, for example.

Third Embodiment

Note that gesture operations such as enlarging/reducing an image have typically been valid only at the location where the gesture operation has been performed. That is, gesture operations have not been shared with other remote locations.

However, for example, page data displayed at location A may be enlarged such that certain portions of the page data are not displayed at the display 3, but because the page data is not enlarged at location B, a stroke or a marker may be written at location B in the portion of the page data that is not displayed at location A. In this case, the stroke or marker written at location B may not be displayed at location A. Note that the above problem associated with the enlargement of the page data at a certain location is not limited to a stroke or a marker but also applies to remote contexts as described above in connection with the first embodiment. That is, depending on the display position of a remote context, the remote context may not be displayed at a location where the page data is enlarged.

In light of the above, the image processing system 1 according to the present embodiment enables the sharing of gesture operations such as enlarging/reducing an image among a plurality of locations.

Figure 24:
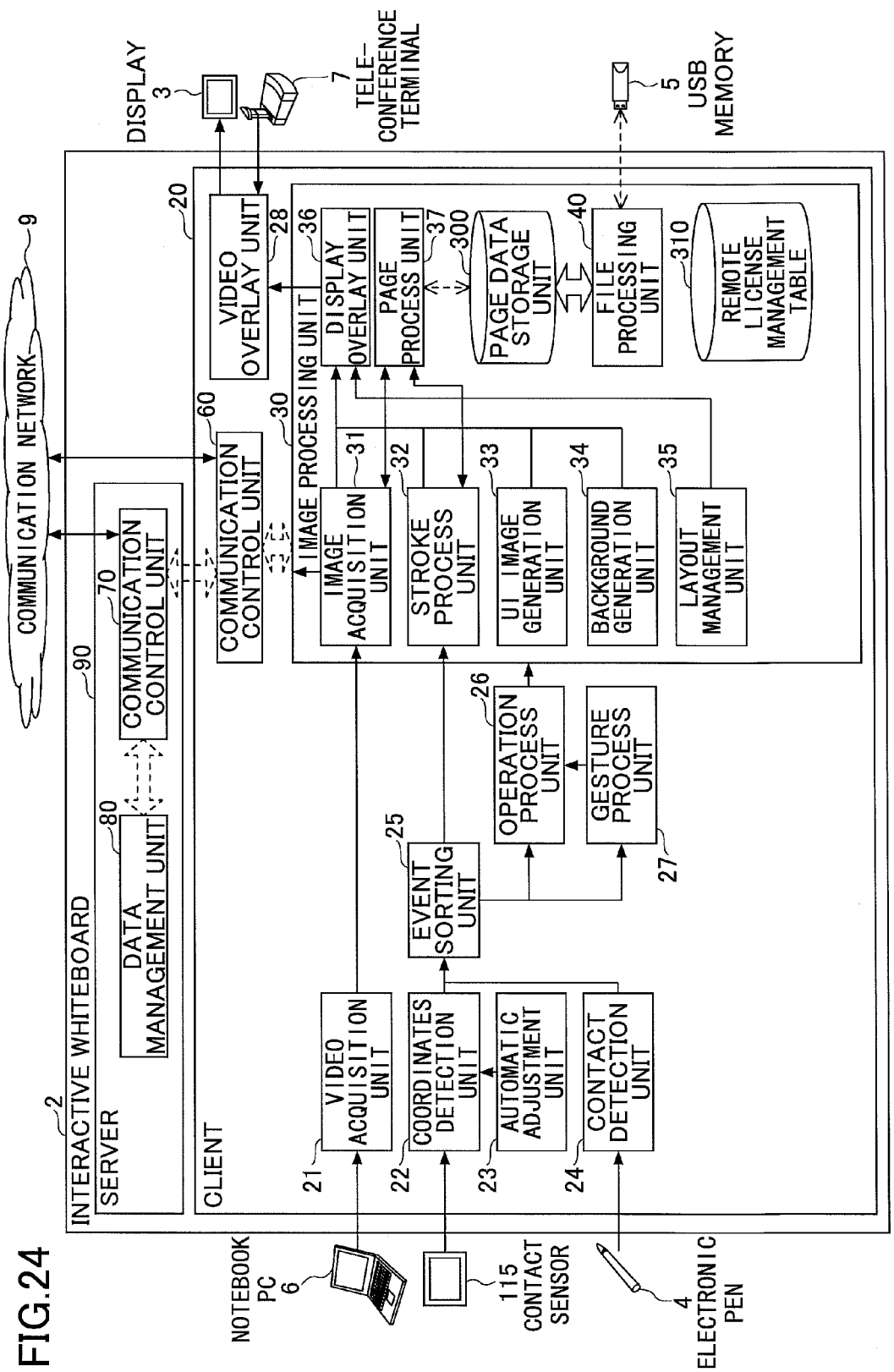
FIG. 24 is a block diagram illustrating an exemplary functional configuration of an interactive whiteboard according to another embodiment of the present invention.

FIG. 24 is a block diagram illustrating an exemplary functional configuration of the interactive whiteboard 2 according to the present embodiment. Note that the functional configuration illustrated in FIG. 24 includes the functional blocks illustrated in FIG. 3 aside from the finger determination unit 29-1, the finger input start standby timer 29-2, the marker process unit 38, and the context process unit 39.

The gesture process unit 27 creates an affine transformation matrix according to the gesture content of an event that is determined by the event sorting unit 25 to be a gesture operation. An affine transformation matrix may be used to represent scaling (enlargement/reduction), rotation, reflection, and translation (parallel movement) of coordinates of an image, for example. In the present embodiment, an affine transformation matrix is created mainly for representing enlargement, reduction, and parallel movement of coordinates. Note that the affine transformation matrix is an example of operation information of the present invention.

Figures 25A, 25B:
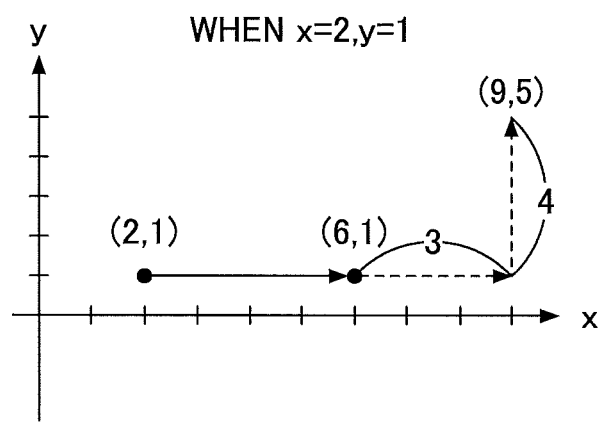
FIGS. 25A and 25B illustrate an example of an affine transformation matrix.

FIG. 25A illustrates an example of an affine transformation matrix. An affine transformation matrix may be represented by a 3×3 matrix in which the upper left 2×2 matrix represents enlargement/reduction, and the lower left 1×2 matrix represents parallel movement, for example. According to the exemplary affine matrix illustrated in FIG. 25A, the coordinates (x, y) are scaled by a scale factor of 3 in the x-direction (left as is in the y-direction), translated by a translation vector of 3 in the x-direction, and translated by a translation vector of 4 in the y-direction. By having the operating location transmit the affine transformation matrix to other locations, the other locations may enlarge/reduce/translate an image in a manner similar to the operating location.

FIG. 25B illustrates an exemplary case in which the above affine transformation matrix is applied to the coordinates (2, 1). That is, by applying the affine transformation matrix, the coordinates (2, 1) are transformed and displayed as coordinates (9, 5).

The affine transformation matrix created by the gesture process unit 27 is output to the image processing unit 30, and an image reflecting the gesture is displayed on the display 3. Also, the affine transformation matrix is stored in the page data storage unit 300. The remote operation transmitting unit 65 of the operating location transmits the affine transformation matrix to the remote operation receiving unit 75 of the communication control unit 70, the remote operation receiving unit 75 outputs the affine transformation matrix to the remote operation process unit 83, and the remote operation transmitting unit 76 transmits the affine transformation matrix output thereto from the remote operation process unit 83 to the remote operation receiving unit 75 of the client 20 of the other locations. In turn, the image processing unit 30 of the other locations displays an image reflecting the gesture on the display unit 3.

Figure 26:
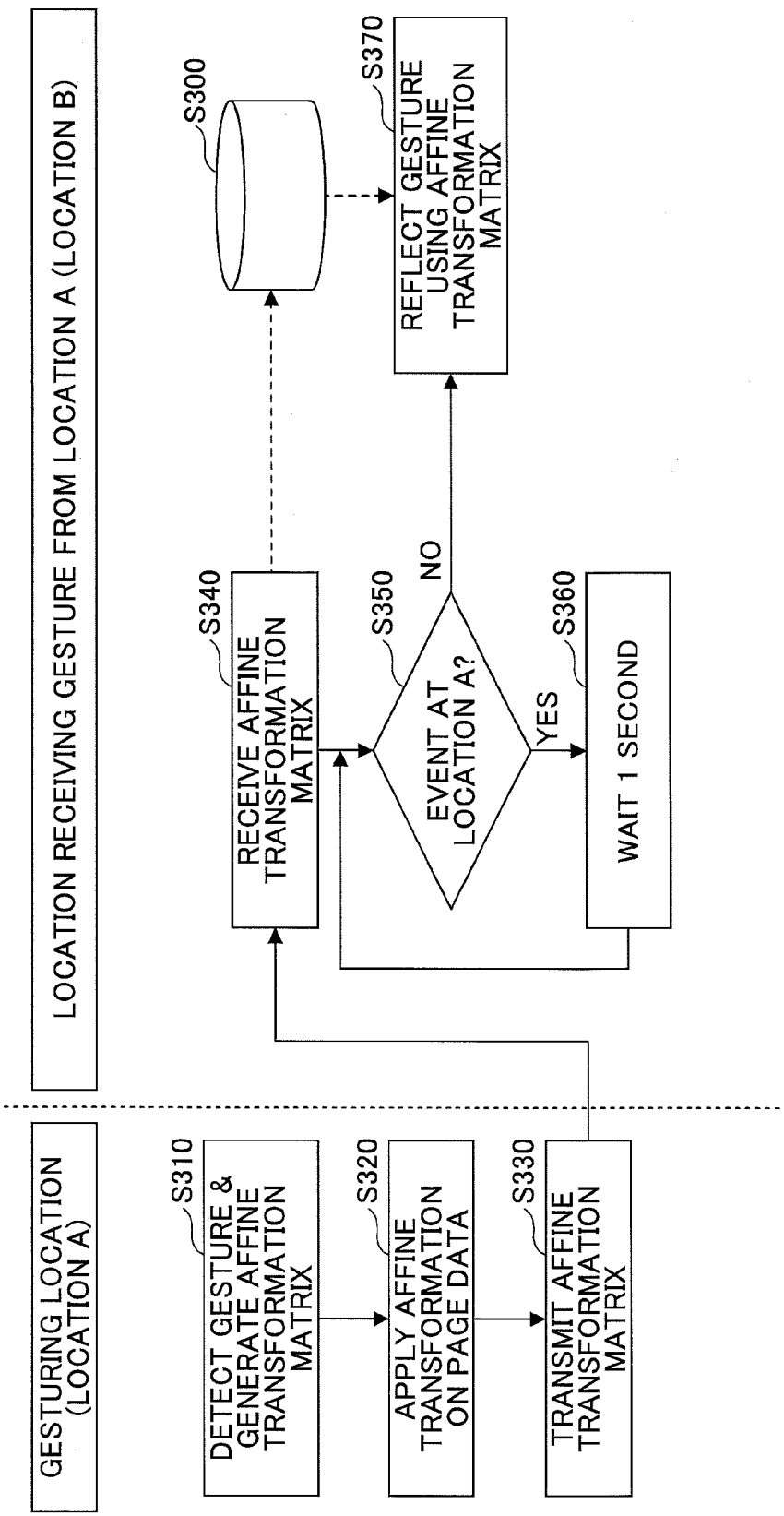
FIG. 26 is a flowchart illustrating exemplary process steps for sharing a gesture operation at two locations.

FIG. 26 is a flowchart illustrating exemplary process steps for sharing a gesture at two locations. In the following description, the operating location where the gesture is performed is referred to as location A, and the location receiving the gesture is referred to as location B.

First, the gesture process unit 27 of location A detects a gesture and creates an affine transformation matrix (step S310).

Then, the page process unit 37 of the image processing unit 30 applies the affine transformation to the coordinates currently displayed on the display 3 to display an image reflecting the gesture on the display 3 (step S320). The affine transformation matrix is stored in the page data storage unit 300 in association with the corresponding page so that the affine transformation matrix may be transmitted to the other location B.

Then, location A transmits the affine transformation matrix to location B (step S330). Specifically, the remote operation transmitting unit 65 of the client 20 of location A outputs the affine transformation matrix to the server 90. The remote operation receiving unit 75 of the server 90 receives the affine transformation matrix and outputs the affine transformation matrix to the remote operation process unit 83. The remote operation process unit 83 reads the IP address of location B registered in the participating location management table 820 and outputs location identification information of location A and the affine transformation matrix to the remote operation transmitting unit 76. In this way, the remote operation transmitting unit 76 transmits the location identification information of location A and the affine transformation matrix to the remote operation receiving unit 66 of location B.

In turn, the remote operation receiving unit 66 of location B receives the affine transformation matrix (step S340). The affine transformation matrix is then output to the image processing unit 30 of location B, and the image processing unit 30 stores the affine transformation matrix in the page data storage unit 300.

Rather than immediately applying the affine transformation matrix, the page process unit 37 of location B determines whether an event is being detected at location A (step S350). That is, in a case where a stroke or a marker is being drawn at location A, if the affine transformation matrix is immediately applied to enlarge/reduce/translate an image being displayed before reflecting the stroke or marker in the image, the display position of coordinates input at location A has to be changed.

Accordingly, the page process unit 37 determines whether the remote operation receiving unit 66 has received the events listed below, for example. Note that these events are mainly related to a change in the display content of a page.

Pen down event
Marker event
Gesture event
Remote PC operation event

Note that the remote PC operation event refers to an operation of the notebook PC 6 based on coordinates detected by the coordinates detection unit 22 while an image displayed on the notebook PC 6 is being displayed on the display 3. That is, the user may be able to operate the notebook PC 6 (e.g. starting an application, opening/closing a window, selecting a file) by operating the display 3. Note, also, that the pen down event may include drawing a stroke, deleting a stroke, scaling (enlarging/reducing) a stroke, and moving a stroke, for example.

If the above events are detected (step S350, YES), the page process unit 37 waits for one second (step S360). Note that the above waiting time of one second is an example of a third predetermined time period of the present invention. The waiting time is not particularly limited and any suitable time period for detecting whether the event at location A has come to a halt may be used, for example.

If none of the above events is detected (step S350, NO), the page process unit 37 displays on the display 3 an image reflecting the gesture resulting from applying the affine transformation matrix stored in the page data storage unit 300 (step S370).

As described above, the image processing system 1 according to the present embodiment enables the sharing of gesture operations with other locations such that a user at each location may view the same portion of a page. Also, by waiting for the appropriate time to reflect the gesture operation in the case where another event is occurring at the location where the gesture operation has been performed, process operations such as enlargement/reduction of a page may be implemented in a timely manner.

Although the present invention has been described above with reference to certain preferred embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory computer-readable medium for storing processor readable code such as a floppy disk, a hard disk, a CD ROM, a magnetic tape device or a solid state memory device. The non-transitory computer-readable medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-192282 filed on Sep. 17, 2013 and Japanese Patent Application No. 2014-180410 filed on Sep. 4, 2014, the entire contents of which are hereby incorporated by reference.

What is claimed is:

1. An information processing apparatus including a display unit that displays an image, the information processing apparatus comprising:
processor configured to implement
a determination unit configured to determine that an electronic pen or a pointer has come into contact with the display unit;
a display control unit configured to control the display unit to display a display corresponding to the pointer when the determination unit determines that the contact with the display unit has been made by the pointer;
a coordinate detection unit configured to detect coordinates of the contact with the display unit;
a time measurement unit configured to start a time measurement operation when the coordinate detection unit detects the coordinates;
a coordinate storage unit configured to store the coordinates in chronological order; and
a contact information receiving unit configured to receive contact information indicating that a contact with the display unit has been made by the electronic pen;
wherein the display control unit connects the coordinates and displays the connected coordinates, and
wherein the time measurement unit starts the time measurement operation in a case where a width of the coordinates of the contact with the display unit detected by the coordinate detection unit is greater than a lower limit threshold value and less than an upper limit threshold value, the contact information receiving unit does not receive the contact information from the electronic pen, and the coordinate detection unit detects the coordinates of the contact with the display unit made by the pointer without the contact information receiving unit receiving the contact information.

2. The information processing apparatus as claimed in claim 1, wherein the display corresponding to the pointer is displayed at the display unit for a first predetermined time period and is subsequently deleted.

3. The information processing apparatus as claimed in claim 1, wherein the display corresponding to the pointer is displayed for a first predetermined time period and is subsequently deleted over a second predetermined time period.

4. The information processing apparatus as claimed in claim 1, wherein the display control unit controls the display unit to display a display corresponding to the electronic pen when the determination unit determines that the contact with the display has been made by the electronic pen.

5. The information processing apparatus as claimed in claim 1, wherein the display corresponding to the pointer and a display corresponding to the electronic pen are displayed to be distinguishable from each other.

6. The information processing apparatus as claimed in claim 5, wherein the display corresponding to the pointer and the display corresponding to the electronic pen are displayed in different widths.

7. The information processing apparatus as claimed in claim 5, wherein the display corresponding to the pointer and the display corresponding to the electronic pen are displayed at different opacities.

8. The information processing apparatus as claimed in claim 1,
wherein when the contact information receiving unit does not receive the contact information, an operation for enlarging, reducing, or moving an image displayed at the display unit is detected based on a history of coordinates detected by the coordinate detection unit.

9. The information processing apparatus as claimed in claim 8, wherein the image displayed at the display unit is enlarged, reduced, or moved after a third predetermined time period elapses from a time the operation for enlarging, reducing, or moving an image is detected.

10. A non-transitory computer-readable medium having a program stored thereon that causes an information processing apparatus to execute an information processing method comprising:

a determination step of determining that an electronic pen or a pointer has come into contact with a display unit of the information processing apparatus;

a display control step of controlling the display unit to display a display corresponding to the pointer when a determination is made in the determination step that the contact with the display unit has been made by the pointer;

a coordinate detection step of detecting coordinates of the contact with the display unit;

a time measurement step of starting a time measurement operation when the coordinate detection step detects the coordinates;

a coordinate storage step of storing the coordinates in chronological order; and a contact information receiving step of receiving contact information indicating that a contact with the display unit has been made by the electronic pen;

wherein the display control step connects the coordinates and displays the connected coordinates, and wherein the time measurement step starts the time measurement operation in a case where a width of the coordinates of the contact with the display unit detected by the coordinate detection step is greater than a lower limit threshold value and less than an upper limit threshold value, the contact information receiving step does not receive the contact information from the electronic pen, and the coordinate detection step detects the coordinates of the contact with the display unit made by the pointer without the contact information receiving step receiving the contact information.

* * * * *